United States Patent [19]
Salkind et al.

[11] 3,782,856
[45] Jan. 1, 1974

[54] COMPOSITE AERODYNAMIC BLADE WITH TWIN-BEAM SPAR

[75] Inventors: Michael J. Salkind, Newtown; William C. Reinfelder, Woodbridge, both of Conn.

[73] Assignee: United Aircraft Corporation, East Hartford, Conn.

[22] Filed: May 31, 1972

[21] Appl. No.: 258,333

[52] U.S. Cl. ............... 416/226, 416/230, 416/233
[51] Int. Cl. ............................................. B64c 27/46
[58] Field of Search ............... 416/226, 229, 230, 416/241 A, 233

[56] References Cited
UNITED STATES PATENTS

| | | | |
|---|---|---|---|
| 3,028,292 | 4/1962 | Hinds | 156/214 |
| 3,097,982 | 7/1963 | Stoner | 156/211 |
| 3,476,484 | 11/1969 | Brunsch | 416/230 |
| 3,477,796 | 11/1969 | Weiland | 416/226 X |
| 3,484,174 | 12/1969 | McCoubrey | 416/226 X |
| 3,528,753 | 9/1970 | Dutton et al. | 416/226 |
| 3,713,753 | 1/1973 | Brunsch | 416/226 |

FOREIGN PATENTS OR APPLICATIONS

| | | | |
|---|---|---|---|
| 1,334,446 | 7/1963 | France | 416/230 |

*Primary Examiner*—Everette A. Powell, Jr.
*Attorney*—Vernon F. Hauschild

[57] ABSTRACT

A composite aerodynamic blade having twin-beam spars, which blade is fabricated in two halves which are eventually joined.

Each spar assembly includes a spar comprising a plurality of high tensile strength fiber members bonded together to form a fiber composite extending from substantially the blade tip to the blade root and a connecting loop inboard of the blade root end of the core. A blade cuff member, including a selectively shaped wedge member extending through the loop and bonded to the fibers thereof, includes redundant provisions for connecting the blade cuff to the rotor hub. Two such spar assemblies are bonded to opposite sides of the blade cover so that the cover carries blade torsional loads. This forms a twin-beam blade in which triple, redundant centrifugal and bending load paths are present between each of the spar assemblies and the hub. For purposes of shape stability, a central low-density core member may be bonded to the spar assembly and cover. In a modified blade, a torque-tube may envelop and be bonded to the spar assemblies and blade trailing edge pockets may be bonded thereto to form the blade cross section.

108 Claims, 19 Drawing Figures

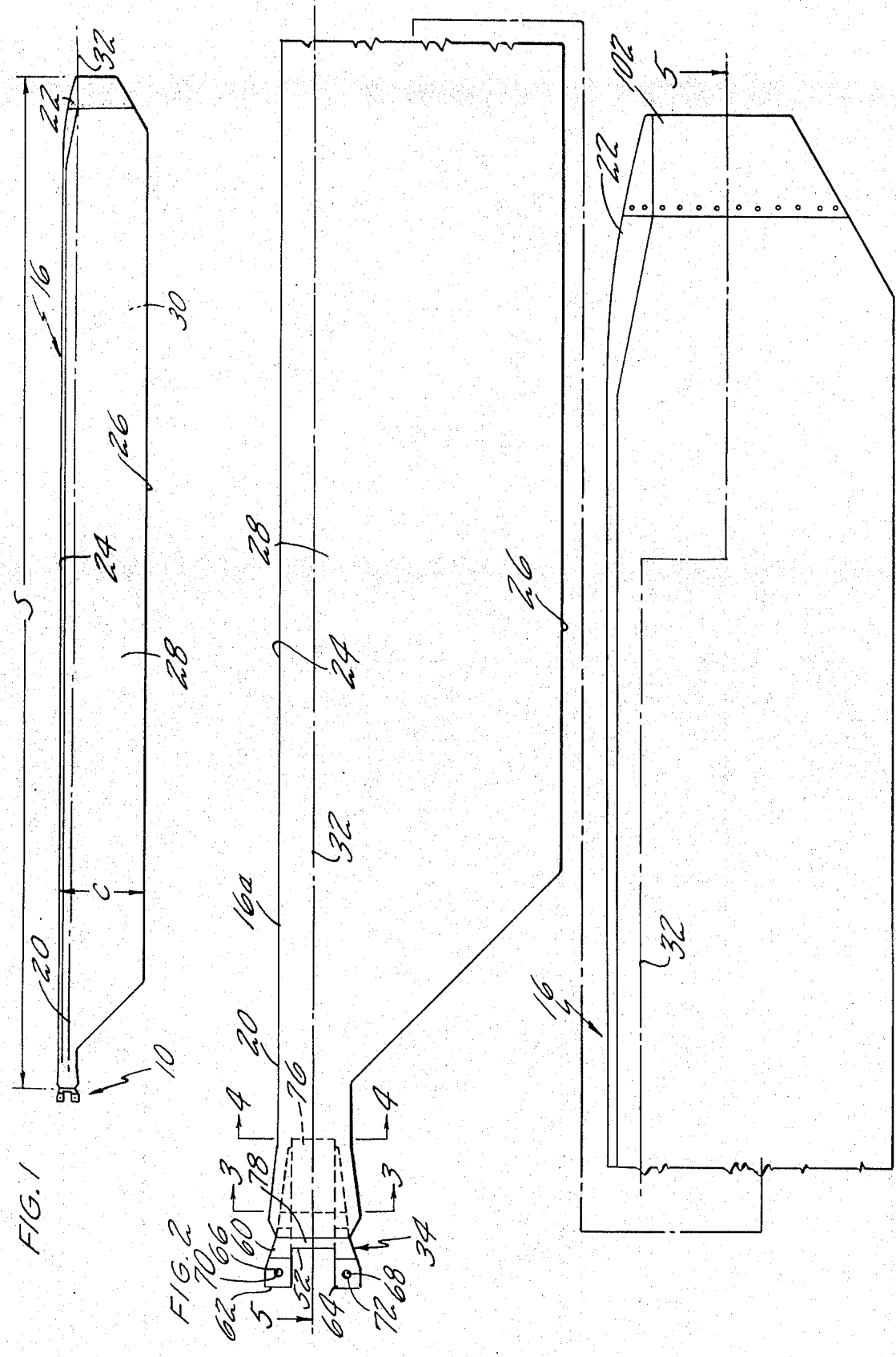

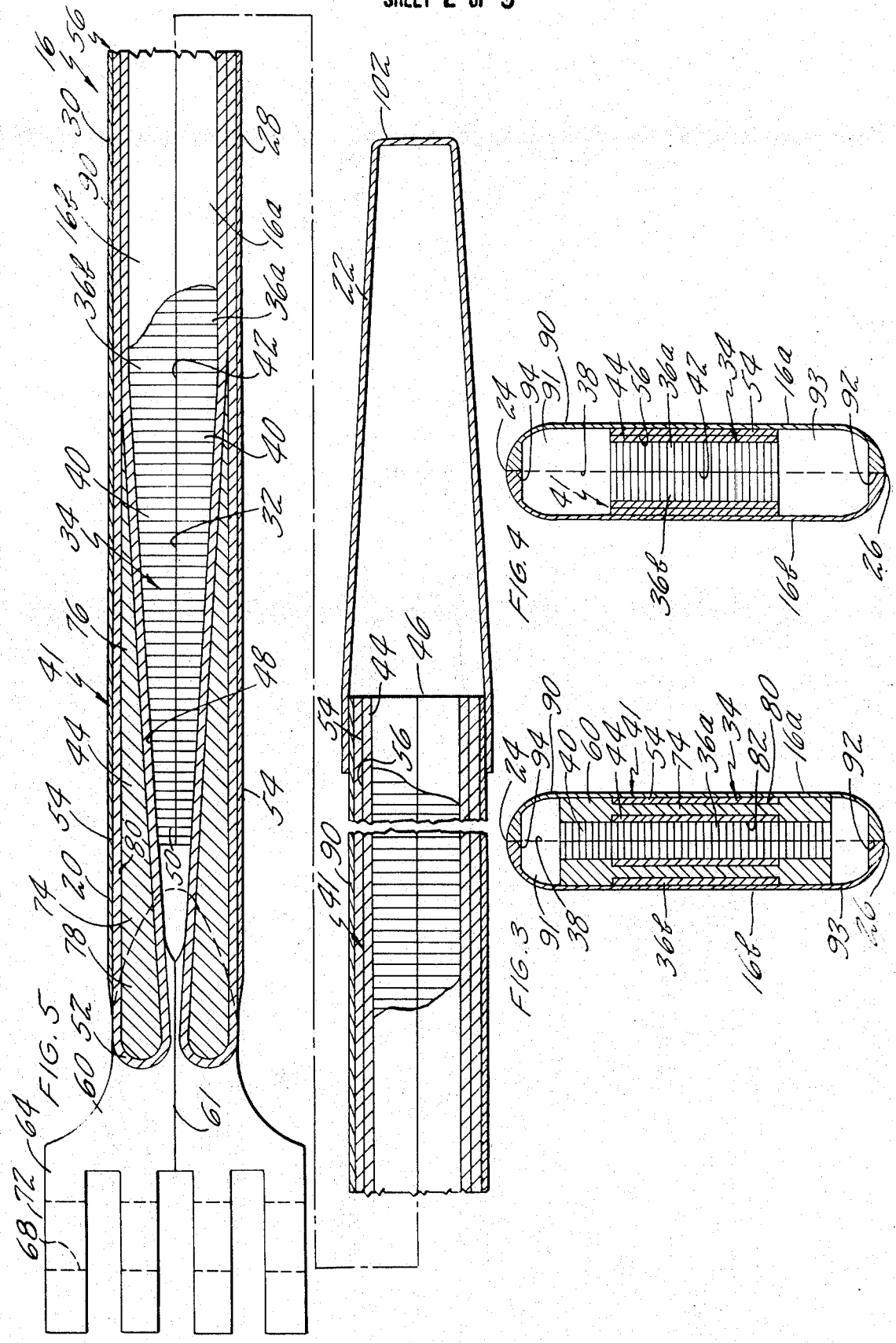

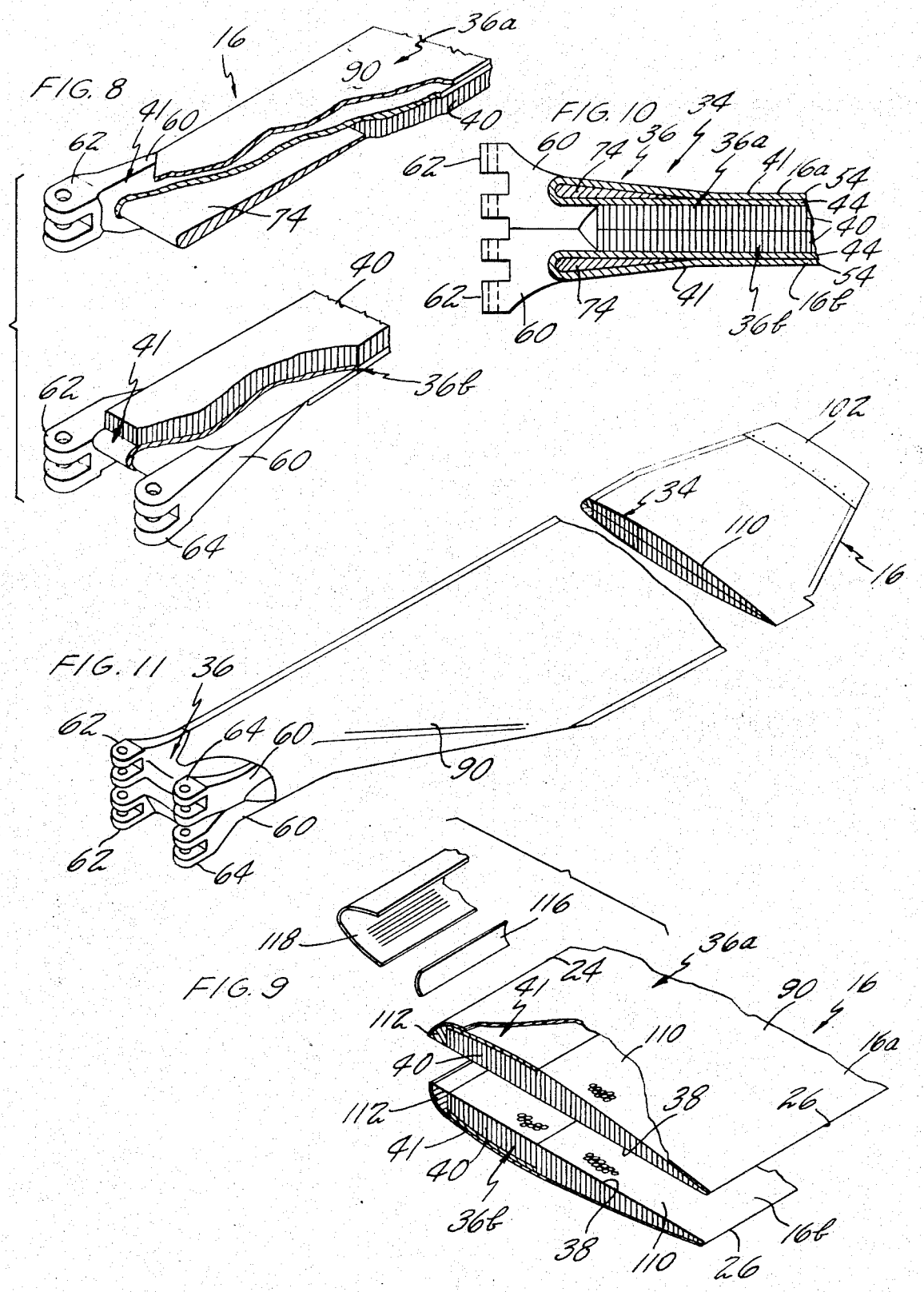

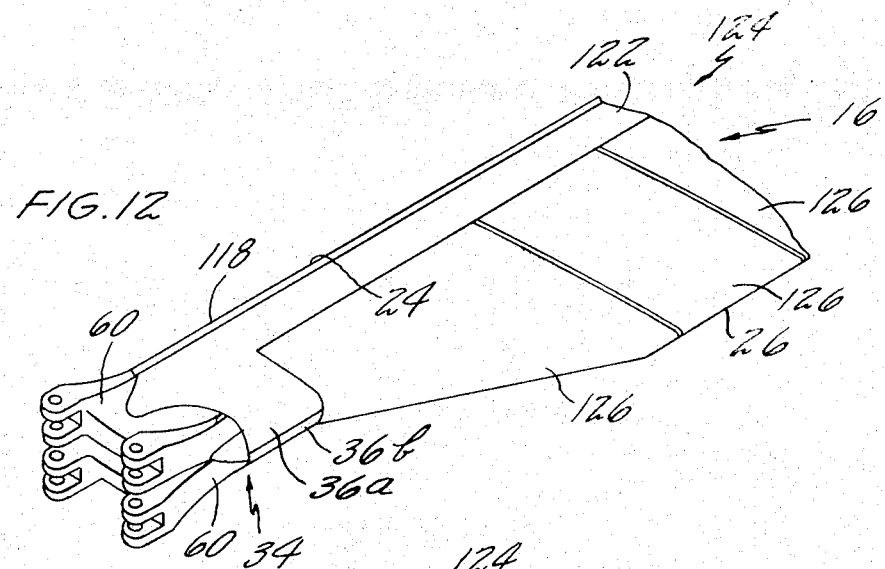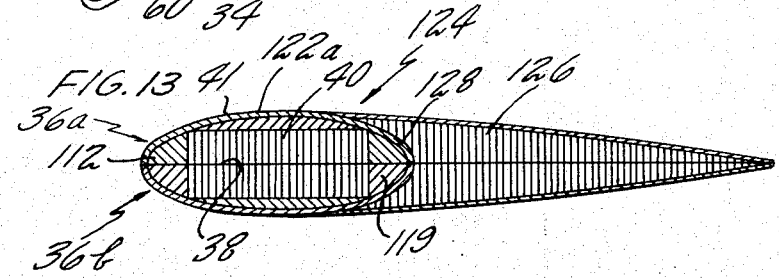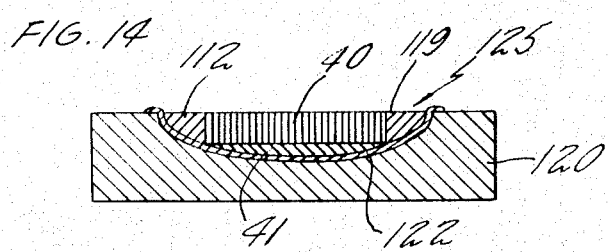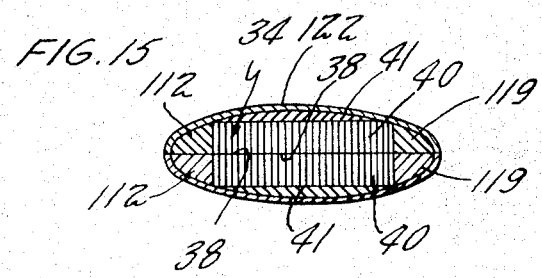

COMPOSITE AERODYNAMIC BLADE WITH TWIN-BEAM SPAR

CROSS-REFERENCES TO RELATED APPLICATION

Some of the material disclosed, described and claimed in this application is also shown in an application Ser. No. 258,141 being filed on even date entitled "Composite Helicopter Rotor and Blade" in the name of inventor Robert Zincone.

BACKGROUND OF THE INVENTION

Field of Invention

This invention relates to aerodynamic blades of the type which, for example, could be used as a helicopter main rotor or tail rotor blade, or as an aerodynamic propeller blade, and which is of composite design utilizing both lightweight nonmetallic materials and metallic materials and which can be fabricated in two blade halves, which are eventually joined to form the aerodynamic blade, and which includes two structural spars, and is therefore called the twin-beam spar blade.

Description of the Prior Art

In the aerodynamic blade art, there are many different blade designs. For example, there is the aerodynamic blade of the type shown in U.S. Pat. No. 2,754,918, wherein nonstructural trailing edge pockets are attached to a D-shaped structural spar, which is in turn attached to the rotor hub for rotation therewith with other similar blades. In a blade of this construction, the spar carries all of the blade's centrifugal loads, all of the blade bending loads, and all of the blade torsional loads. In this type of blade, the spar is sometimes made so as to be of C-shaped cross section but continues to carry all of the aforementioned loads. A second type of blade is the blade shown in U.S. Pat. No. 2,657,754, which includes a structural spar enclosed within the blade airfoil section and which has the necessary filler material positioned thereabout to form the airfoil section of the blade. In this blade design also, the strucutral spar carries substantially all of the centrifugal, torsional and bending blade loading. The aforementioned blades are basically metallic blades and it has been felt in the aircraft industry that weight saving can be gained if high strength, lightweight, nonmetallic materials can be utilized as a substitute for at least some of the metallic blade parts. Accordingly, many composite blades have been conceived, for example, that shown in U.S. Pat. No. 3,455,757. Experience has shown that one of the major problem areas in a composite blade is at the connection of the blade to the hub, and more particularly, to the connection between the nonmetallic portions of the blade and the metallic portions of the blade root end connection. It is accordingly the object of this invention to teach a composite blade which has all of the desirable attributes of both the metallic and nonmetallic elements thereof and which provides a good root end connection.

SUMMARY OF THE INVENTION

A primary object of the present invention is to provide a composite aerodynamic blade which has twin-beam spars so as to provide two main independent load path systems between the blade and the hub, one path system being through each spar, and wherein there are also three load carrying paths between the blade and the cuff in each spar. In all, there are accordingly a total of six load carrying paths between the blade and the cuff, thereby substantially increasing blade attachment reliability.

It is an object of this invention to teach such an aerodynamic blade, wherein the spars consist of a plurality of high tensile strength, low weight filament or fiber composite members extending along substantially the blade span or longitudinal axis and which serve to carry the majority of the blade centrifugal loading. Further, wherein these fibers may be connected to a low density, central core member so as to cooperate therewith in carrying the majority of the blade bending loads. Further, the blade cover or torque-tube is fabricated of a plurality of layers of filaments or fibers of high modulus, which layers are oriented in selected directions so as to carry the majority of the blade torsional loading, due to the high torsional stiffness thereof.

It is a further object of this invention to teach a composite blade which is light in weight and whose cost of manufacture compares favorably with the forerunner all-metal blades. The composite metal blade has the further advantages of field repairability, slow crack propagation characteristics and will have increased lift capabilities because it can be fabricated of a higher twist due to the higher fatigue allowables in an all-composite blade.

It is a further object of this invention to teach an all-composite blade which has improved fatigue-strain capacity, and which is readily moldable so as to permit the use of advanced aerodynamic geometry to permit optimization of the hovering lift performance of a helicopter rotor, without comprising the aircraft's speed capability.

It is still a further object of this invention to teach a twin-beam spar blade in which each beam consists of glass fiber-epoxy fiber or filament composite member extending spanwise along a central low density core member and being of substantially U-shaped, folded or forked cross section so that the two legs of the U of the fibers extend in the blade span or longitudinal axis direction and are bonded to each other and to the core member and form a connecting loop at the blade root end. A titanium root end fitting, having multiple attachment lugs to connect to the rotor hub, and having a tear-drop shaped plate member about which the glass fiber-epoxy composite spar portion is wrapped and to which it is bonded. In such a construction, the centrifugal and bending loads of the blade are carried by the twin-beam spars and transferred to the titanium root end fittings through the adhesive bondings between the end fitting plate member and the fiber glass-epoxy members, and with redundancy being provided by the fiber wrap-around about the plate portion of the root end fitting.

It is a further object of this invention to teach a composite aerodynamic blade in which high twist, camber and swept tips can be utilized without concern for its effect on blade stresses and control loads.

It is still a further object of this invention to teach such a composite blade which utilizes a high fatigue strain-allowable blade material, such as glass fiber-epoxy, graphite fiber-epoxy, boron fiber-epoxy, PRD–49 fiber (by E. I. DuPont)-epoxy, or the graphite-glass fiber combination taught herein, which has a strain-allowable that is twice as high as that of aluminum and, among the metals, is approached only by that of titanium.

It is a further object of the present invention to teach a blade which uses composite materials, thereby permitting tailoring of the material properties to suit different requirements in different locations in the blade. For example, high modulus composite material, such as graphite, can be used to provide high torsional stiffness in the inboard portion of the blade span for aerodynamic stability, and a low torsional stiffness laminate used at the tip to minimize stresses and to control loads.

It is still a further object of the present invention to teach an all-composite blade in which two completely separate glass fiber-epoxy beam spars, in cooperation with the blade cover or torque tube, are the primary structural members. Each beam spar has its own titanium root end attachment consisting of a teardrop shaped plate member around which the glass fiber-epoxy composite is wrapped and bonded to the opposite sides thereof. Each titanium root-end attachment has multiple-attachment lugs for attaching to the rotor hub. The centrifugal and bending loads are carried primarily by the twin-beam spars, and the load is transferred to the titanium root end attachments by the adhesive bond, with the wrap-around geometry providing a redundant path. The titanium teardrop shaped plate member and glass fiber geometry are designed to minimize peak shear stresses in the adhesive bond. Torsional loads are carried primarily by the ± 45° high modulus graphite fiber-epoxy blade skin or torque-tube. The skin or cover also contains spanwise glass fiber-epoxy, which improves the fatigue strain-allowable. Torsional loads are transferred from the skin or cover to both titanium root end fittings by adhesive bonds. The two titanium root end fittings are bonded together to provide a torsional load path. The two blade halves are adhesively bonded in a centerline splice, at the chordline in an uncambered blade, preferably using adhesive preimpregnated composite broadgoods in the core area.

It is a further object of this invention to teach an all-composite aerodynamic blade which can be manufactured in two halves at low cost since the manufacturing procedure is relatively simple, readily reproducible, and relatively low in cost because tolerances are machined off at the chordline or centerline jointline of each blade half, and the outer surface of the blade half is formed against a precision hard tool mold.

It is still a further object of the present invention to teach a composite blade having a twin-beam spar construction which provides the flexibility that this twin-beam spar can be enveloped directly within a torque-tube and have trailing edge pockets bonded thereto to form the blade or the twin-beam spar can cooperate with appropriately shaped filler material to form the blade aerodynamic shape and have the spar and filler material enveloped within a blade cover which serves as the torque-tube.

Other objects and advantages of the present invention may be seen by referring to the following description and claims, read in conjunction with the accompanying drawings.

BRIEF DESCRIPTION OF THE DRAWINGS

FIG. 1 is a plan view of an aerodynamic blade utilizing our invention.

FIG. 2 is a partial plan view of one embodiment of our all-composite aerodynamic blade, called the full cover blade.

FIG. 3 is a cross-sectional showing through line 3—3 of FIG. 2.

FIG. 4 is a cross-sectional showing through line 4—4 of FIG. 2.

FIG. 5 is a cross-sectional showing through line 5—5 of FIG. 2.

FIGS. 8 and 9 illustrate the assembly process used during the fabrication of the full cover modification of our blade from the two halves thereof.

FIG. 10 illustrates the root end portion of the full cover modification of our blade so assembled.

FIG. 11 is a perspective showing of our all-composite aerodynamic blade in its full cover form.

FIG. 12 is a partial perspective showing of the second embodiment of our blade, called the torque-tube blade.

FIG. 13 is a cross-sectional showing through the spar and a trailing edge pocket of the FIG. 12 blade.

FIG. 14 depicts the fabrication process of the torque-tube blade embodiment.

FIG. 15 depicts the assembly process of the torque-tube blade embodiment.

DESCRIPTION OF THE PREFERRED EMBODIMENT

Figure 6:
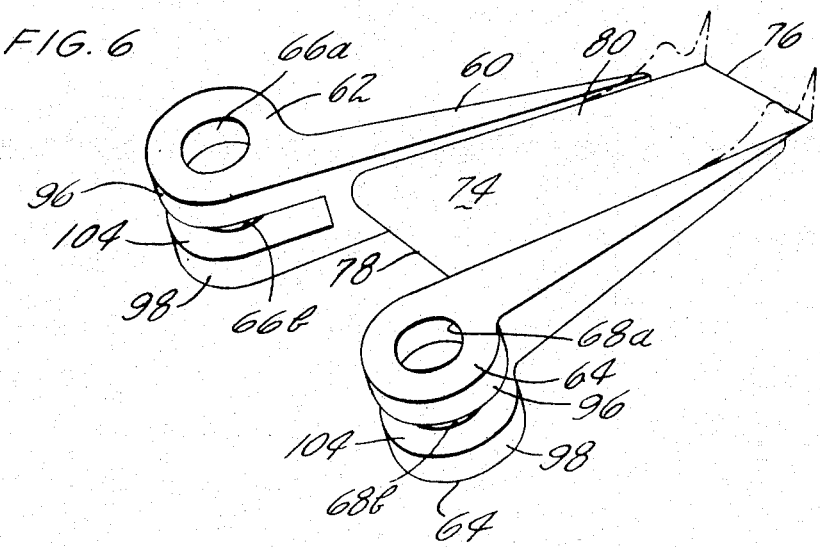
FIG. 6 is a perspective showing of one of the blade cuff or root end fittings.

Referring to FIG. 1 we see an aerodynamic blade utilizing our invention. While the blade is shown as a helicopter main rotor blade, it should be borne in mind that it is equally applicable as the helicopter tail rotor blade or to any type of fan construction, such as an aerodynamic propeller blade. A plurality of blades 16 extending radially outwardly from a rotor hub for rotation therewith to generate lift. Our blade 16 can be used with any type of known helicopter rotor, such as the articulated rotor of U.S. Pat. No. 3,097,701, the rigid rotor of U.S. Pat. No. 3,409,249 and the elastomeric bearing rotor of U.S. Pat. No. 3,111,172, for example. Blade 15 includes a root end 20, a tip end 22, a leading edge 24, a trailing edge 26, an upper airfoil surface 28, a lower airfoil surface 30, and longitudinal axis 32. The blade span is designated by the letter S and the blade chord is designated by the letter C.

Now referring to FIGS. 2 through 5, we see a first embodiment of our all-composite blade invention in the form of a full cover blade. Blade 16 consists of upper and lower or left and right spanwise extending blade halves 16a and 16b, which are joined in a fashion to be described hereinafter. Blade 16 includes a double or twin-beam spar assembly 34, which includes upper beam spar assembly 36a and lower beam spar assembly 36b which are joined along longitudinal axis 32 and the centerline splice, which is the blade chordline 38 in an uncambered blade and will be so referred to hereinafter for simplicity.

Spar assembly 36a includes central core member 40, which extends substantially between blade root 20 and blade tip 22 with its inner surface 42 extending along blade longitudinal axis 32 and chord line 38. Central core 40 is preferably made of a low density material, such as honeycomb construction or machined or cast plastic foam. Each twin-beam spar assembly further consists of a spar 41 which comprises a plurality of high tensile strength fibers or filaments in a suitable matrix of U-shaped, folded or forked cross section which are bonded together and to central core 40 for substantially the full length of the core and extend therebeyond toward the blade root to form a loop and more particularly are a first layer or series of plies of high tensile strength fibers or filaments in a suitable matrix, which are preferably of the broadgood variety and made of preimpregnated continuous glass fiber or other suitable high tensile strength materials such as graphite, boron, PRD-49 by E. I. DuPont and metal fiber composites. The first series of layers of such fibers or filaments 44 commences at substantially the blade tip end 46 of central core 40 and extends therefrom along outer surface 48 of core 40 to the blade root end 50 of core 40 and therebeyond, and are then folded or turned back upon themselves to form fiber or filament composite loop 52, and then form a second series of layers or plies of such fiber or filament 54 which extend from the blade root end 50 to the blade tip end 46 of core member 40 so as to abut the first series of filaments 44 along line 56. It will accordingly be seen that these filament plies or layers are of substantially U-shaped, folded or forked cross section with loop 52 forming the curvature of the U and plies 54 and 44 forming the legs of the U. In a fashion to be described hereinafter, the fiber or filament layer series 54 and 44 are bonded to the central core 40 along surface 48. The layers of series 44 and 54 may be selectively terminated at stations short of core end 46 so as to produce a thinning effect in the layers 44 and 54 between the root end 50 and the tip end 46 of core 40. Layer series 44 and 54 cooperate to define U-shaped fiber composite layer unit or spar 41. Spar 41 is bonded to the interior of cover 90. Each of the twin-beam spars, such as 36a, also includes a root end fitting or cuff 60 (See FIG. 6) which is preferably made of titanium and is shaped to define plural lugs 62 and 64, which include pin receiving holes 66 and 68, respectively, through which connecting pins 70 and 72, respectively, extend and also extend through corresponding apertures in rotor hub mechanism (not shown) to thereby connect blade 16 to the rotor hub for rotation therewith. Cuffs 60 of twin-beam spar 34 are bonded along line 61. Cuff 60 also includes teardrop shaped plate member 74 which has its pointed end 76 projecting toward the blade tip 22 and has its maximum thickness, curved end 78 projecting toward the blade root 20 or hub. Plate member 74 is formed so as to define two smooth surfaces 80 and 82 along which fiber or filament composite layers 54 and 44, respectively, of spar 41 extend and to which they are bonded in a fashion to be described hereinafter.

While blade 16 is described herein as including core member 40 and various filler members, it should be borne in mind that these members are for purposes of shape stability primarily and that blade 16 is composed basically of two composite spars 41 and blade cover 90 bonded thereto. If these primary load carrying parts, 41 and 90, were fabricated sufficiently rigid, no other structural parts would be needed and all core and filler members could be eliminated. The same is true of the torque-tube 122 and spars 41 in the FIG. 12-15 modification.

It should be borne in mind that twin-beam 36b is constructed in precisely the same fashion as just described in connection with twin-beam 36a and is shaped to cooperate therewith to form twin-beam spar 34 when joined thereto.

It will be noted that with such a twin-beam spar construction, there are independent load paths between the blade and the hub attachment through each beam spar 36a and 36b and that there are also three redundant load carrying paths between each beam spar 36a and 36b and the blade cuff attachment. To be specific, these paths consist of the connection between plate end 78 and filament loop 52, and the bonds between filament layers 44 and 54 and surfaces 82 and 80, respectively.

As best shown in FIGS. 3 and 4, the twin-beam spars 36a and 36b cooperate with filler material 91 and 93 and blade cover 90 to form the blade contour. Blade cover 90 is also made in two halves and the two halves are bonded along surfaces 92 and 94. So as to provide ample bonding area, the blade cover is built up at both the blade leading edge 24 and the blade trailing edge 26, as shown in FIGS. 3 and 4. The blade cover 90 is preferably fabricated of a plurality of layers of preimpregnated fiber or filament material, preferably alternate layers of glass fibers and graphite fiber sheets, with the fibers of these sheets selectively oriented with respect to the blade longitudinal axis 32, for example, some of the sheets have fibers which form an angle of $+45°$ with axis 32, other sheets will have fibers which form an angle of $-45°$ with axis 32, other sheets will have fibers which form any selected desired angle, including a $0°$ angle, with axis 32 so that the blade cover 90 is of desired torsional stiffness and is therefore capable of carrying the blade torsional loads. In one of our preferred embodiments the fibers of layers 44 and 54 of spar 41 form a $0°$ angle, and the layers of cover 90 consist of one-third layers or fibers of $0°$ glass fiber-epoxy composite and two-thirds layers or fibers of $\pm 45°$ graphite fiber-epoxy composite. Since the filaments of fibers or layers 44 and 54 of the beam spars 36a and 36b extend substantially along the blade longitudinal axis 32, and since the fiber layers 44 and 54 are bonded to cuff plate 74, and since the cuffs 60 are bonded along mating surface 61, the twin-beam spars 36a and 36b cooperate to carry substantially all blade centrifugal loading and bending loads.

A preferred embodiment of blade root end fitting or cuff 60 which may be used with each of the twin-beam spars 36a and 36b is shown in FIG. 6. For purposes of weight saving, the redundant lugs 62 and 64 are made as spaced flange members 96 and 98, which have aligned apertures 66a and 66b and 68a and 68b therein and which are spaced to define slot 104 therebetween to each receive a corresponding flange member (not shown) from a hub connected member (not shown) having corresponding apertures therein. Connecting pins, such as 70 and 72 of FIG. 2, pass through the aligned apertures in each of the lugs 62 and 64 so as to provide redundant retention between cuff 60 and the hub connecting member. It is important that cuff 60 be fabricated so that there is minimal shear stress in the bond between surfaces 80 and 82 thereof and the filaments of layers 44 and 54. With the teardrop shape construction of plate member 74, this bond shear stress is minimal and is illustrated graphically in phantom in FIG. 6 to show that the maximum shear stress occurs at the tip end 76 of plate 74 and our experience therewith shows it to be well within tolerable limits.

Now referring to FIGS. 8 through 11, we see details and the assemblage of the full cover embodiment of our blade. FIG. 8 depicts the twin-beam spars in spaced but aligned relationship, partially broken away, so that it may be seen that as the two spar assemblies 36a and 36b are brought together and their central core members 40 are bonded, they form the assembly 34 shown in cross section in FIG. 10. Actually in the full cover blade embodiment, the entire half blades 16a and 16b, shown in spaced relationship in FIG. 9, are conded together to form blade 16. As best shown in FIG. 11, nonstructural filler material 110 is positioned at the afterside of the beam spars 36a and 36b and, to counterbalance these nonstructural members 110, appropriate nonstructural counterweights 112 are positioned in the interior of leading edge 24. Filler material 110 and core member 40, and any other required filler material could be a single, integral piece. Core 40 and filler 110 perform the same shape stability function. The counterweights 112 are preferably made of lead-shot filled polymer of the type taught in U.S. Pat. No. 3,323,577, and the nonstructural members 110 are preferably made of low density material such as honeycomb or plastic foam. In certain blades, counterweights 112 might not be needed. The counterweights 112, the beam spars 36a and 36b and the trailing edge fillers 110 and external cover 90 are shaped so as to cooperate in forming one half of an airfoil section such that, when one half 16a of the blade is bonded to the second half 16b of the blade, a complete airfoil is formed. The cover or skin 90 is preferably made of a plurality of layers of high tensile strength fiber composite material, such as alternate layers of glass fiber and graphite fiber composite sheets, with the fibers thereof extending in different directions with respect to blade longitudinal axis 32. For instance some of the sheets will have fibers which define a positive angle of about 45° with axis 32, some of the sheets will have fibers which define a negative angle of about 45° with axis 32, and other sheets will have fibers which are selectively oriented so that when the various sheets are bonded, a cover or torque-tube 90 is fabricated which has high torsional resistance and therefor carries the blade torsional loading since torque-tube 90 is bonded both to the twin-beam spar 34 and the root end fittings 60. Since each of the twin beams 36a and 36b includes the redundant spanwise extending high tensile strength fiber composite spar 41 and the central core member 40 bonded together, and also includes cuff member 60 bonded together, the twin-beam spar 34 serves to carry both centrifugal and bending loads of the blade and transfers those loads to the hub through the redundant load paths of each beam spar 36a and 36b and through the triple load path described supra from each twin-beam spar 36a and 36b to the cuff 60 and hence the hub. A splice cap 116, which may be made of a glass fiber and carbon composite, or other composite may be bonded to the abutted leading edges 24 of the blade halves 16a and 16b to improve the bond therebetween, and a lightning rod-abrasion strip 118 may be positioned thereover. This strip 118 is preferably made of metal. FIG. 11 depicts the full cover blade embodiment in perspective with tip cap 102 positioned at the outer end of the blade. The full cover blade is accordingly seen to be a unitary blade with all parts thereof bonded together and with the blade cover 90, the fiber composite spars 41, and cuff 60 constituting the main load carrying components.

We will now describe the method of fabrication of our all-composite blade, full cover embodiment. The two major tools used in fabrication are clamshell, female molds defining the contour of the upper and lower airfoil blade surface 28 and 30, respectively. Each blade half 16a and 16b is fabricated in precisely the same fashion.

Figure 7A:
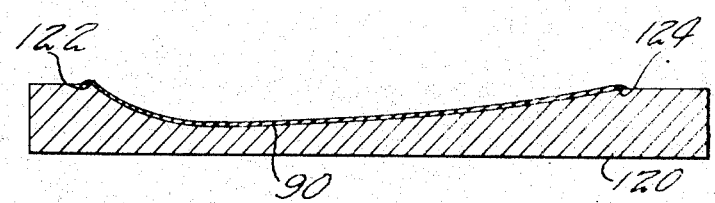
FIGS. 7A through 7E illustrate the fabrication process of the full cover modification of our blade.
Figure 7B:
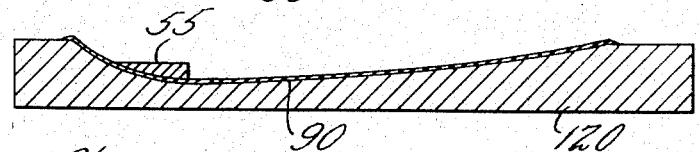
Figure 7C:
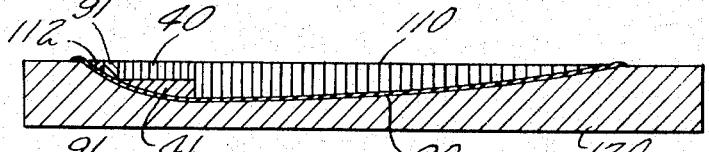
Figure 7D:
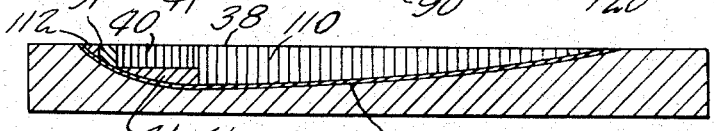
Figure 7E:
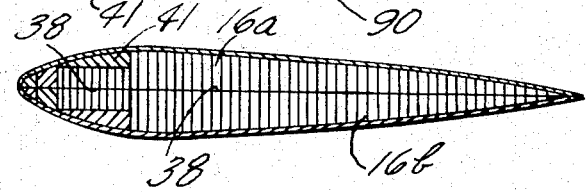

Referring to FIGS. 7A through 7D we will described the manner in which one half of blade 16 is formed, and it will be evident that the second half is formed in precisely the same way, prior to the blade halves being bonded together as shown in FIG. 7E. As the first step, precut, preferably preimpregnated, glass fiber-epoxy and fiber graphite broadgoods are layed up along the inner contour of the female mold 120. These layers or plies of glass fiber-epoxy and graphite broadgoods are preferably layed individually and alternately and at selected angular relationship so that they will build up to form a blade cover 90 of desired thickness. The layers are permitted to overlap the mold trim lines 122 and 124. Additional layers of this material are preferably included at the leading and trailing edges of the blade to give maximum bonding area when the two blade halves are eventually joined as shown in FIG. 7E. This leading edge and trailing edge blade buildup is best depicted in FIG. 3 and 4. We are now ready to lay up the redundant filament or fiber spar 41 of the beam spar assembly 36. We accordingly now lay up a series of preimpregnated glass fiber sheets, preferably with the glass fiber strands or filaments extending along the direction of the spar span or the eventual blade longitudinal axis 32 and we commence the laying up of these sheets toward the tip end of mold 20 and cause the sheets to lay directly against the uncured cover 90 material and to extend to the past the blade root end or end of mold 120 so that at least an equal length of each layer or ply extends below or beyond the mold as it is layed up in the mold. Cover 90 could be cured, if desired, before the spar lay-up began. Preferably, each of the secondary sheets of glass fiber composite commence at various distances from the mold tip end so as to produce a thinning effect in the spar between the blade root end and the blade tip end. We are now ready to position the titanium root end fitting or cuff 60 after having prepared its surfaces 80 and 82 so as to constitute a good bonding surface and having applied an adhesive layer of a material such as AF126. A similar adhesive layer is also preferably positioned between cuff 60 and blade cover 90. The cuff 60 is then selectively positioned on the glass fiber broadgoods sheets so stacked, using conventional positioning devices such as pins, clamps and other mechanisms to properly position the root end fitting 60 and, in particular, its wedge shaped plate member 74 with respect to the mold. Next, on a layer-by-layer basis, starting with what is going to be the innermost layer of glass fiber broadgoods, we take the half of each glass fiber composite strip which is extending beyond the mold and wrap is around the exposed side of wedge member 74 of cuff 60 and cause that layer to lie smoothly against not only the wedge member surface but also the surface of the glass fiber layers 44 which were already layed. This sheet is caused to extend from the blade root end of the mold to substantially the blade tip end of the mold. Each layer so extending is successively layed up in this fashion. While our broadgood fiber sheets or layers are preferably impregnated fiber material, it should be borne in mind that the fiber material could be layed up dry and the plastic constituent impregnated thereinto when in the mold It should be noted that both the cover layers and the spar layers are broadgoods, woven or unwoven, with the strands of each layers thereof extending in the desired direction or directions.

We are now prepared to cure the portion of the blade half layed up to this point. We use conventional means to do this including enveloping the blade so layed up in a vacuum bag. Bleeder cloth and caul plates are preferably placed around the material before the mold is placed in the vacuum bag. The bag is then put in vacuum to compress the layers together and the entire tool, as layed up to its present state, is placed in the autoclave under heat and pressure to perform the curing function. The next step in the procedure is to position the central core member 40, whose function is to stabilize the remainder of the blade, and which may not be needed if cover 90 and fiber composite spars 41 are sufficiently rigid. Central core 40 is made of low density material, such as cast or premachined foam, or honeycomb material and, while it is shown to be of rectangular cross section, it could well be of any desired cross section, such as an I-beam. The core member 40 is layed upon the redundant U-shaped fiber composite spar 41, and it is preferable that a layer of adhesive be positioned therebetween. While we prefer to insert the core member 40 at this time in our blade fabrication procedure, it should be borne in mind that the remainder of the blade could be fabricated and the core member 40 inserted at a later time and joined to the remainder of the blade in a conventional fashion. Trailing edge filler member 110, which may be of honeycomb or foam, may be positioned in the mold directly against the uncured layers of cover or torque-tube 90 and to the trailing edge side of the abutting core 40, but preferably cover 90 and core 41 are cured before core 40 and filler 110 are bonded thereto. Counterweights 112 are inserted at the same time.

With the blade layed up as shown in FIG. 7C, we next securely position mold 120 and machine this blade half, using a router or other convenient apparatus or method, to the precise blade chordline 38, as shown in FIG. 7D.

The other half of blade 16 will be fabricated in precisely the same fashion and the mass distribution of the two machined blade halves 16a and 16b will then be determined and corrections will be made as required to insure the proper mass distribution in the finished full blade. For example, the mass distribution of the blade halves could be corrected as required by selectively adding weight to or deleting weight from the leading edge counterweight 112.

The two blade halves 16a and 16b will then be bonded together as shown in FIG. 7E, using appropriate and conventional supporting and bonding means. To insure a good contact between the two half-blade chordlines 38, it might be advisable to place a layer of structural composite such as a layer of adhesive preimpregnated glass fiber cloth, across the abutting surfaces of the two blade halves.

A second embodiment of our blade, which we call the torque-tube blade, is depicted in FIGS. 12 and 13, and the method of manufacture and assembly thereof is depicted in FIGS. 14 and 15. The torque-tube blade embodiment is very similar to the full cover blade embodiment shown in FIGS. 1 through 11 and differs in that, as best shown in FIGS. 12 and 13, the bonded spar assemblies 36a and 36b, each of which comprise central core member 40, redundant U-shaped fiber or filament spar 41, rear spar filler member 119, leading edge filler 91, leading edge counterweight 112, and cuff 60, when bonded together along chordline 38, are enveloped within torque-tube 122 to form torque-tube assembly 124. Lightning rod-abrasion strip 118 is preferably positioned at the leading edge thereof. A plurality of non-structural trailing edge pockets 126 are bonded to the after surface 128 of twin-beam spar torque-tube assembly 124 and are shaped so as to cooperate therewith in forming the air-foil cross-sectional shape of blade 16. Pockets 126 may be of conventional design and preferably fabricated to properly covered honeycomb, rib or foam filler. The leading edge of twin-beam spar torque-tube assembly forms the leading edge 24 of blade 16 while the narrow end of the tapered pockets 126 form the blade trailing edge 26. The major distinction between the torque-tube assembly blade of FIGS. 12 and 13 and the full cover blade of FIGS. 1 through 11 is that in the former the twin-beam spar 34, with appropriate filler and counterweight material is enveloped within blade cover 90 and these parts form the entire blade airfoil shape, while in the latter, the twin-beam spar 34 is enveloped within torque-tube 122, which corresponds to cover 90, to form twin-beam spar torque-tube assembly 124, and pocket members 126 are attached thereto to form the cross-sectional shape of blade 16. Both torque-tube assembly 124 and full cover blade 16 are fully bonded units. While a plurality of nonstructural pockets 116 are shown, One continuous pocket may be utilized, if desired. Further, a full structural cover could envelop both assembly 124 and pocket or pockets 126.

Referring to FIG. 14, we see the method of fabricating one half of twin-beam spar torque-tube assembly 125 of blade 16. FIG. 14 corresponds to FIG. 7A-D. In similar fashion to that utilized and described in FIGS. 7A-7D, the various layers of material of the torque-tube 122 are layed up in selected directions relative to one another along the inner surface of female mold 120. Torque-tube 122 is preferably made of the same material and in the same manner of fiber orientation as blade cover 90. The fiber composite or filament composite of spar 41 are now layed in position against the torque-tube layers 122 so layed up utilizing the same materials and following the same procedure as described for the spar 41 in FIG. 7A-7D. The cuff member 60 is then placed in position as in the FIG. 7 method and the fibers of spar 41 are wrapped therearound to be bonded thereto and layed in successive layers extending from the mold root end to the mold tip end against the spar layers already layed up. In the fashion previously described in connection with FIGS. 7A-7D, the torque-tube assembly so layed up is then cured. Core member 40, filler member 119 and counterweight 112 are then bonded into position as shown in FIG. 14. With the torque-tube modification so layed up, a machining process is utilized to machine the spar half to the proper chordline 38 as in the FIG. 7A-7D construction. The second half of the spar is fabricated in similar fashion and the two spar halves are bonded together as shown in FIG. 15 in the same fashion utilized for the full cover modification shown in FIG. 7E so as to form twin-beam spar torque-tube assembly 124, to which the trailing edge pockets 126 will be bonded as shown in FIGS. 12 and 13.

It will be realized from the above description that our all-composite blade 16, whether the full cover modification of FIGS. 1-11 or the torque-tube assembly modification of FIGS. 12-15, is unique in that it includes a twin-beam spar 34 and that the conventional blade loads are carried by different parts of our blade than in the conventional blades described earlier. For example, because the glass fiber strands or filaments of the spar U-shaped fiber composite spar 41 all extend in substantially the direction of the blade span or blade longitudinal axis, these fibrous materials carry the vast majority of the blade centrifugal loading but virtually none of the torsion loading. When these glass fiber filament spars 41 are supported by the central, low density core members 40, this assembly cooperates therewith to carry the blade bending loads. To carry the blade torsional loads, in both the full cover blade modification of FIGS. 1-11 and the torque-tube assembly modification of FIGS. 12-15, we use glass fiber and/or other filaments, preferably of high modulus and layed at selected angles with respect to the span direction or longitudinal axis 32 of the blade, so that these various filament layers cooperate to form a torsionally stiff blade cover 90 in the FIGS. 1-11 embodiment and torque-tube 122 in the FIGS. 12-15 embodiment. We use graphite fiber or some other high modulus fiber in our cover 90 and torque-tube 112, as well as the glass fiber, because the graphite filaments have high stiffness. Boron fibers would also be a satisfactory high stiffness fiber to be used with the glass fibers to produce the high torsional stiffness cover 90 or torque-tube 122. While our blade could conceivably be made entirely of glass fiber or filament composites, in all likelihood such would produce a heavier blade since a weight reduction is achieved by the use of the graphite or boron fibers therewith.

To improve blade fatigue qualities, we have found it desirable to add spanwise oriented fiber elements in the cover and/or torque-tube 90 or 122 of the balde. These spanwise fibers in the blade cover or torque-tube, 90 and 122, produce the additional advantage of providing a second load carrying path for the blade centrifugal loads along with the path provided by the beam spar.

Those skilled in the art will realize that our blade could be manufactured by fabricating the twin spar as disclosed herein and then positioning and connecting the twin beam spar so fabricated in a blade cover member, which has previously been manufactured either as a one or two piece construction. Further, cover 90 (or torque-tube 122) with fiber composition spars 41 bonded thereto could be made as a hollow blade and the filler material added thereafter.

In addition, it might be desirable in certain installations to intersperse layers of the fiber material of the blade cover 90 or torque-tube 122 with those of the fiber composite spars 41. This interspersed construction would provide the advantages of increasing the strength of the bond between the cover and the twin-beam spar layers by providing a greater area of bond therebetween and would position the various fiber composite layers more uniformly around the neutral axis of the cover-spar assembly so as to avoid blade distortion caused by the difference in elastic properties and coefficient of thermal expansion between the skin 90, or torque-tube 122, and the layer materials of spar 41.

Since our composite blade includes almost all nonmetallic parts, the blade is inherently corrosion free. A further advantage of the composite blade, which in our case is a blade primarily of nonmetallic parts bonded together, is that such blades are easily field repairable. Should a separation between bonded parts occur, our experience has been that inserting a room temperature setting epoxy, and the application of readily available weights, such as sandbags, effects a very suitable repair. With respect to combat damage, the procedure used successfully for years in field repair of glass fiber composite propeller blades can be utilized. The combat damage procedure is to repair the damaged area by removing all loose material, inserting urethane foam or other suitable low density filler material into the prepared cavity, placing an appropriate skin patch on the blade surface, and then feathering the surface.

While our blade has been described herein as being fabricated of composite fiber members in the spar, blade cover and torque-tube, it should be borne in mind that composite filaments, bonded wire or bonded plastic or metal sheet material could also be used solely or in combination. The spar blade cover and torque-tube material may be divided into layers with the layers of the spar interleaved with the layers of the blade cover or torque-tube.

We wish it to be understood that we do not desire to be limited to the exact details of construction shown and described, for obvious modifications will occur to a person skilled in the art.

We claim:

1. A twin-beam spar, composite aerodynamic blade adapted to be connected to a hub and rotate with other blades to generate power and having a tip, a root, a leading edge, a trailing edge, a chord and a longitudinal axis and including:

A. a first spar member including:
  1. a first low density central core member extending in the direction of the blade longitudinal axis for at least a portion of the distance between the blade root and the blade tip,
  2. a plurality of first fiber composite members extending from substantially the blade tip end of said core member to the blade root end thereof and therebeyond and being folded back upon itself so as to form a loop and then extend from the blade root end of the core member to substantially the blade tip end thereof thereby forming a plurality of second fiber composite members abutting said plurality of first fiber composite members and cooperating therewith in forming a formation of fiber composite members of substantially U-shape cross section and with said first and second fiber composite members bonded together and to said core member,
  3. a first cuff member including:
    a. a cuff plate member extending through said loop in said fiber composite members, and to which said fiber composite members are bonded,
    b. an attachment means to permit attachment of said first cuff member to the hub, B. a second spar member including:

1. a second low density central core member extending in the direction of the blade longitudinal axis for at least a portion of the distance between the blade root and the blade tip,
2. a plurality of second fiber composite members extending from substantially the blade tip end of said core member to the blade root end thereof and therebeyond and being folded back upon itself so as to form a loop and then extend from the blade root end of the core member to the blade tip end to substantially the blade tip end thereof thereby forming a plurality of second fiber composite members abutting said plurality of first fiber composite members and cooperating therewith in forming a formation of fiber composite members of substantially U-shape cross section bonded together and to said core member,
3. a second cuff member including:
   a. a cuff plate member extending through said loop in said fiber composite members and to which said fiber composite members are bonded,
   b. an attachment means to permit attachment of said second cuff member to the hub,
C. filler material cooperating with said first and second spar members to define a blade of airfoil shaped cross section, and
D. a torque-tube enveloping said first and second spar members comprising a plurality of multi-directional layers of fiber composite members so as to carry the torque loads of the blade.

2. A blade according to claim 1 wherein said attachment means of said first and second cuff members are shaped to define redundant load paths between the cuff members and the hub.

3. A blade according to claim 1 wherein said first fiber composite members and said second fiber composite members include high tensile strength fibers and are principally oriented to extend substantially in the direction of the blade longitudinal axis.

4. A blade according to claim 3 wherein said first and second fiber composite members are glass fiber.

5. A blade according to claim 4 wherein said layers of said torque-tube are broadgoods of graphite fiber and glass fiber, and wherein said first and second fiber composite members are broadgoods.

6. A blade according to claim 1 wherein said cuff plate member is of teardrop shape and wherein said first fiber composite members are bonded to one of the sides thereof and said second fiber composite members are bonded to the opposite side thereof and wherein said plate member contacts said loop in said fiber composite members.

7. A blade according to claim 1 wherein said filler material includes trailing edge pockets positioned between said first and second spar members and said blade trailing edge and counterweights positioned between said first and second spar members and said blade leading edge.

8. A twin-beam spar, composite helicopter rotor blade including a root, a tip, a leading edge, a trailing edge, a chord, a span, an upper airfoil surface, a lower airfoil surface, a longitudinal axis and having:
A. a first spar adjacent the upper airfoil surface and including:
   1. a low density core member extending in the direction of the blade span and extending substantially from the blade root to the blade tip and having a first surface adjacent said blade longitudinal axis and a second surface nearer said upper airfoil surface then said first core surface, and
   2. a plurality of high tensile strength fiber composite members positioned between said core member and said blade upper airfoil surface and commencing with a first layer of fiber composite members extending substantially from the blade tip to the blade root end of the core member and therebeyond and turning back upon itself to form a first loop and then a second layer of fiber composite members adjacent said first layer of fiber composite members and positioned between said first layer of fiber composite members and said upper airfoil surface and extending substantially to said tip end, with said first layer of fiber composite members bonded to said second surface of said core member and said second layer of fiber composite members bonded to said first layer of fiber composite members,
B. a second spar adjacent the lower airfoil surface and including:
   1. a low density core member extending in the direction of the blade span and extending substantially from the blade root to the blade tip and having a first surface adjacent said blade longitudinal axis and a second surface nearer said lower airfoil surface than said first core surface, and
   2. a plurality of high tensile strength fiber composite members positioned between said core member and said blade lower airfoil surface and commencing with a first layer of fiber composite members extending substantially from the blade tip end to the blade root end of the core member and therebeyond and turning back upon itself to form a second loop and then a second layer of fiber composite members adjacent said first layer of fiber composite members and positioned between said first layer of fiber composite members and lower airfoil surface and extending substantially to said blade tip, with said first layer of fiber composite members bonded to said second surface of central core member and said second layer of fiber composite members bonded to said first layer of fiber composite members and with said first surfaces of said core members bonded together,
C. a tear-shaped plate member extending through said first loop so as to be positioned substantially against the turn of the loop and being bonded to both said first layer and said second layer of said fiber composite members of said first spar,
D. a tear-shaped plate member extending through said second loop so as to be positioned substantially against the turn of the loop and being bonded to both said first layer and said second layer of said fiber composite members of said second spar,
E. means to connect said first and second plate members to the blade root, thereby providing three load carrying paths between each of said first and second spars and said blade root, namely, the bond between said plate member and said first layer of fiber composite members in each spar, the bond between said plate member and the second layer of fiber composite members in each spar, and the load carrying joint formed between said plate member and the turn of each of said loops.

9. A blade according to claim 8 and including a plurality of layers of high tensile strength composite fibers enveloping said spars so joined and preferably extending in different directions with respect to said blade longitudinal axis so as to form a torque-tube about said spars.

10. A blade according to claim 8 wherein said central core members are made of solid foam construction.

11. A blade according to claim 8 wherein said central core members are made of honeycomb construction.

12. A blade according to claim 8 wherein said fiber composite members are continuous.

13. A blade according to claim 12 wherein said continuous fiber composite members are made of glass fiber.

14. A blade according to claim 9 wherein said fibers in said torque-tube layers are made of glass fibers and/or graphite fibers.

15. A blade according to claim 8 including a blade cuff and wherein each of said plate members is connected to said blade cuff, which cuff is fabricated so as to be connected to a rotor hub.

16. A blade according to claim 15 wherein said plate members and said blade cuff are made of titanium.

17. A blade according to claim 8 and including means connected to and shaped so as to cooperate with said first and second spars to define the airfoil portion of the blade.

18. A blade according to claim 15 wherein said blade cuff is fabricated to define two load-carrying structural paths between each of said plate members and a rotor hub.

19. A composite, twin-spar, for a helicopter rotor blade including a root end, a tip end, a span, an upper surface, a lower surface, a longitudinal axis, and having:
  A. a first spar adjacent defining the upper surface and including:
   1. a low density core member extending in the direction of the span and extending substantially from the root end to the tip end and having a first surface adjacent said longitudinal axis and a second surface nearer said upper surface than said first core surface, and
   2. a plurality of high tensile strength fiber composite members positioned between said core member and said upper airfoil surface and commencing with a first layer of fiber composite members extending substantially from the tip end to the blade root end of the core member and therebeyond and turning back upon itself to form a first loop and then a second layer of fiber composite members adjacent said first layer of fiber composite members and defining said upper surface and extending substantially to said tip end, with said first layer of fiber composite members bonded to said second surface of said core member and said second layer of fiber composite members bonded to said first layer of fiber composite members,
  B. a second spar defining the lower surface and including:
   1. a low density core member extending in the direction of the span and extending substantially from the root end to the tip end and having a first surface adjacent said longitudinal axis and a second surface nearer said lower surface than said first core surface, and
   2. a plurality of high tensile strength fiber composite members positioned between said core member and said lower airfoil surface and commencing with a first layer of fiber composite members extending substantially from the tip end to the blade root end of the core member and therebeyond and turning back upon itself to form a second loop and then a second layer of fiber composite members adjacent said first layer of fiber composite members and defining said lower surface and extending substantially to said tip end, with said first layer of fiber composite members bonded to said second surface of central core member and said second layer of fiber composite members bonded to said first layer of fiber composite members and with said first surfaces of said core members bonded together,
  C. a tear-shaped plate member extending through said first loop so as to be positioned substantially against the turn of the loop and being bonded to both said first layer and said second layer of said fiber composite members of said first spar,
  D. a tear-shaped plate member extending through said second loop so as to be positioned substantially against the turn of the loop and being bonded to both said first layer and said second layer of said fiber composite members of said second spar, and
  E. means to connect said first and second plate members to the spar root, thereby providing three load carrying paths between each of said first and second spars and said spar root, namely, the bond between said plate member and said first layer of fiber composite members in each spar, the bond between said plate member and the second layer of fiber composite members in each spar, and the load carrying joint formed between said plate member and the turn of each of said loops.

20. A spar according to claim 19 wherein said fiber composite members of said first and second spar are continuous and extend substantially along the blade longitudinal axis and preferably consists of a plurality of layers of broadgoods.

21. A spar according to claim 20 wherein said tear-shaped plate members are made of titanium, and wherein said core member is made of honeycomb construction.

22. A blade according to claim 21 wherein said means connecting said first and second plate members to the spar root is a redundant path, load carrying structure.

23. The method of fabricating a composite aerodynamic blade having a twin-beam spar construction comprising:
  A. fabricating the first half of the blade by:
   1. laying-up a series of alternate layers of sheets of high strength, low weight composite fibers along the inner contour of a female mold of selected half-blade shape to the selected blade cover or torque-tube thickness,
   2. fabricating a spar or beam including the steps of:
    a. laying-up a first series of layers of sheets of high strength, low weight composite fibers commencing at the blade tip end of the mold and extending to the blade root end of the mold with the composite fibers extending in substantially the direction of the blade longitudinal axis while allowing about an equal length of each composite fiber sheet to extend beyond the blade root end of the mold, b. positioning a root end fitting in proper selected position at the blade root end of the mold so that a wedge shaped portion thereof is lying on said first composite fiber sheets and with the pointed end of the wedge extending toward the blade tip end of the mold, c. wrapping each sheet of said first series of composite fiber sheets around the wedge member and then laying-up each sheet of fiber against the layers of said first series of sheets so layed up so as to form a second series of composite fiber sheets extending substantially from the blade root end of the mold to the blade tip end of the mold, 3. treating the blade cover portion and the spar portion so layed up to effect bonding thereof, 4. positioning a selectively shaped, low density core member on the second series of layers of composite fiber sheets so bonded so that the core material extends substantially in the direction of the blade longitudinal axis and extends substantially the full distance between the blade root end of the mold and the blade tip end of the mold, 5. finishing the first half of the blade so fabricated to the proper blade chordline, B. fabricating the second half of the blade following the same procedure, C. connecting the two blade halves so fabricated together so as to form an aerodynamic blade.

24. The method of fabricating a composite aerodynamic blade having a twin-beam spar construction comprising:

A. fabricating the first half of the blade by:

1. laying-up a series of alternate layers of plastic preimpregnated glass fiber and graphite fiber sheets along the inner contour of a female mold of selected half-blade shape to the selected blade cover or torque-tube thickness, 2. fabricating a spar or beam including the steps of:

a. laying-up a first series of layers of plastic preimpregnated glass fiber sheets commencing at the blade tip end of the mold and extending to the blade root end of the mold with the fibers extending in substantially the direction of the blade longitudinal axis while allowing about an equal length of each glass fiber sheet to extend beyond the blade root end of the mold, b. positioning a root end fitting in proper selected position at the blade root end of the mold so that an adhesively surfaced wedge shaped portion thereof is lying on said first glass fiber sheets and with the pointed end of the wedge extending toward the blade tip end of the mold, c. wrapping each sheet of said first series of glass fiber sheets around the wedge member and then laying up each sheet of glass fiber against the layers of said first series of sheets so layed up so as to form a second series of glass fiber sheets extending substantially from the blade root end of the mold to the blade tip end of the mold, 3. curing the blade cover portion and the spar portion so layed up to effect bonding thereof, 4. positioning a selectively shaped, low density core member on the second series of layers of glass fiber sheets so bonded so that the core material extends substantially in the direction of the blade span or longitudinal axis and extends substantially the full distance between the blade root end of the mold and the blade tip end of the mold, and is bonded to said second series of layers, 5. machining the first half of the blade so fabricated to the proper blade chordline, B. fabricating the second half of the blade following the same procedure, and C. bonding the two blade halves so fabricated together so as to form an aerodynamic blade.

25. The method according to claim 24 wherein said sheets of said blade cover and said spar are broadgoods, and wherein said sheets of said first and second series of layers of said spar are caused to terminate at different distances from the blade tip end of the mold so as to effect a thinning or tapering effect of the spar between the blade root end thereof and the blade tip end thereof.

26. The method according to claim 25 wherein the sheets which form the blade cover are layed-up so that the fibers of at least some of the sheets are extending in a different direction than the fibers of at least some of the other sheets.

27. The method according to claim 26 wherein the fibers of most of said sheets define angles of substantially ± 45° with the blade longitudinal axis and wherein the fibers of at least one of said sheets extend in a spanwise direction.

28. The method according to claim 27 and including the additional steps of selectively adding nonstructural counterweights to the inner surface of the blade cover of each blade half before each blade half is machined to the proper blade chordline, and determining the mass distribution of the two blade halves so machined and making any necessary changes to the counterweights as a result of this determination after machining of the two blade halves and before the bonding thereof.

29. The method according to claim 23 wherein the root end fitting is metallic and wherein the method used in connecting the two blade halves is bonding.

30. The method according to claim 29 wherein the two blade halves are bonded by the use of an adhesive layer between the halves.

31. The method according to claim 24 and including the steps of adding additional sheets of plastic impregnated fiber material at the blade cover leading edge and trailing edge so as to provide a greater area for bonding therebetween.

32. The method according to claim 24 and including the additional step of applying an adhesive layer between the root end fitting and the inner surface of the blade cover prior to curing.

33. The method according to claim 24 wherein the curing operation includes applying bleeder cloth and caul plates to the layed-up material in the mold, placing the mold with the layed-up material therein in a vacuum bag, evacuating the bag to compress the layers of layed-up material together, and subjecting the mold and the layed-up material within the vacuum bag so evacuated to selective heat treatment to perform the curing operation.

34. The method of fabricating a composite spar of twin-beam construction for an aerodynamic blade comprising:
  A. fabricating the first half of the spar by:
    1. laying-up a first series of layers of sheets of high strength, low weight composite fibers commencing at the spar tip end of a mold and extending to the spar root end of the mold with the composite fibers extending in substantially the direction of the spar span direction or longitudinal axis while allowing about an equal length of each sheet to extend beyond the spar root end of the mold,
    2. positioning a root end fitting in proper selected position at the spar root end of the mold so that a wedge shaped portion thereof is lying on said first sheets and with the pointed end of the wedge extending toward the spar tip end of the mold,
    3. wrapping each sheet of said first series of sheets around the wedge member and then laying-up each sheet against the layers of said first series of sheets so layed up so as to form a second series of layers of sheets extending substantially from the span root end of the mold to the span tip end of the mold,
    4. positioning a selectively shaped, low density core member on the second series of layers of sheets so bonded so that the core material extends substantially in the direction of the core span or longitudinal axis and extends substantially the full distance between the spar root end of the mold and the spar tip end of the mold,
    5. treating the spar so layed up to effect bonding thereof,
    6. finishing the first half of the spar so fabricated to the proper blade chordline,
  B. fabricating the second half of the spar following the same procedure,
  C. connecting the two spar halves so fabricated together so as to form an aerodynamic blade spar.

35. The method according to claim 34 wherein said first and second series of sheets are plastic impregnated sheets of glass fiber broadcloth, and including the additional step of adhesively bonding the wedge shaped portion of root end fitting to the first and second series of sheets, wherein said spar treating process is a curing process, and wherein said spar half finishing process is a machining process.

36. The method according to claim 35 and including the additional steps of attaching nonstructural trailing edge pockets to the spar so fabricated, and enveloping the spar and trailing pockets with selectively shaped filler and cover material so as to define the airfoil portion of an aerodynamic blade.

37. A twin-beam spar, composite aerodynamic blade adapted to be connected to a hub and rotate with other blades to generate power and having a tip, a root, a leading edge, a trailing edge, a chord and a longitudinal axis and including:
  A. a first spar assembly including:
    1. a first low density central core member extending in the direction of the blade longitudinal axis for at least a portion of the distance between the blade root and the blade tip,
    2. a first spar comprising a plurality of fiber composite members extending from substantially the blade tip end of said core member to the blade root end thereof and therebeyond and being folded back upon itself so as to form a loop and then extending from the blade root end of the core member to substantially the blade tip end thereof thereby forming a formation of fiber composite members of substantially U-shape cross section and with said fiber composite members bonded together and to said core member,
    3. a first cuff member including:
      a. a cuff plate member extending through said loop in said fiber composite members, and to which said fiber composite members are bonded,
      b. an attachment means to permit attachment of said first cuff member to the hub,
  B. a second spar assembly joined to said first spar assembly and including:
    1. a second low density central core member extending in the direction of the blade longitudinal axis for at least a portion of the distance between the blade root and the blade tip,
    2. a second spar comprising a plurality of fiber composite members extending from substantially the blade tip end of said core member to the blade root end thereof and therebeyond and being folded back upon itself so as to form a loop and then extend from the blade root end of the core member to the blade tip end to substantially the blade tip end thereof thereby forming a formation of fiber members of substantially U-shape cross section bonded together and to said core member,
    3. a second cuff member including:
      a. a cuff plate member extending through said loop in said fiber composite members and to which said fiber composite members are bonded,
      b. an attachment means to permit attachment of said second cuff member to the hub,
    c. filler material cooperating with said first and second spar assemblies so joined to define a blade of airfoil shape cross section, and
    d. a torque-tube enveloping said first and second spar assemblies comprising a plurality of multidirectional layers of fiber composite members so as to carry the torque loads of the blade.

38. A blade according to claim 37 wherein said attachment means of said first and second cuff members are shaped to define redundant load paths between the cuff members and the hub.

39. A blade according to claim 37 wherein said cuff plate member is of teardrop shape and wherein said fiber composite members are bonded to the opposite sides thereof and wherein said plate member contacts said loop in said fiber composite members.

40. A twin-beam spar, composite helicopter rotor blade including a root, a tip, a leading edge, a trailing edge, a chord, a span, an upper airfoil surface, a lower airfoil surface, a longitudinal axis, and having:
  A. a first spar assembly adjacent the upper airfoil surface and including:
    1. a low density core member extending in the direction of the blade span and extending substantially from the blade root to the blade tip and having a first surface adjacent said blade longitudinal axis and a second surface nearer said upper airfoil surface than said first core surface, and 2. a first spar comprising a plurality of high tensile strength fiber composite members positioned between said core member and said blade upper airfoil surface and extending substantially from the blade tip end to the blade root end of the core member and therebeyond and turning back upon itself to form a first loop and then extending substantially to said tip end, with said fiber composite members bonded together and to said second surface of said core member, B. a second spar assembly adjacent the lower airfoil surface and including:

1. a low density core member extending in the direction of the blade span and extending substantially from the blade root to the blade tip and having a first surface adjacent said blade longitudinal axis and a second surface nearer said lower airfoil surface than said first core surface, and 2. a second spar comprising a plurality of high tensile strength fiber composite members positioned between said core member and said blade lower airfoil surface and commencing with a first layer of fiber composite members extending substantially from the blade tip end to the blade root end of the core member and therebeyond and turning back upon itself to form a second loop and then extending substantially to said blade tip, with said fiber composite members bonded together and to said second surface of central core member and with said first surfaces of said core members bonded together, C. a tear-shaped plate member extending through said first loop so as to be positioned substantially against the turn of the loop and with said fiber composite members being bonded to the opposite sides thereof, D. a tear-shaped plate member extending through said second loop so as to be positioned substantially against the turn of the loop and with said fiber composite members being bonded to the opposite sides thereof, E. means to connect said first and second plate members to the blade root, thereby providing three load carrying paths between each of said first and second spars and said blade root, namely, the two bonds between said plate member and said fiber composite members in each spar and the load carrying joint formed between said plate member and the turn of each of said loops.

41. A blade according to claim 40 and including a plurality of layers of high tensile strength fiber composite members enveloping said spars so joined and preferably extending in different directions with respect to said blade longitudinal axis so as to form a torque-tube about said spars.

42. A blade according to claim 40 wherein said central core members are made of honeycomb construction.

43. A blade according to claim 40 wherein said central core members are made of solid foam construction.

44. A blade according to claim 40 wherein said fiber composite members are continuous.

45. A blade according to claim 44 wherein said continuous fiber composite members are made of glass fiber.

46. A blade according to claim 41 wherein said fibers in said torque-tube layers are made of glass fibers and/or graphite fibers.

47. A blade according to claim 40 including a blade cuff and wherein each of said plate members is connected to said blade cuff, which cuff is fabricated so as to be connected to a rotor hub.

48. A blade according to claim 47 wherein said plate members and said blade cuff are made of titanium.

49. A blade according to claim 40 and including means connected to and shaped so as to cooperate with said first and second spar assemblies to define the airfoil portion of the blade.

50. A blade according to claim 47 wherein said blade cuff is fabricated to define two load-carrying structural paths between each of said plate members and a rotor hub.

51. A composite, twin-beam spar, for a helicopter rotor blade including a root end, a tip end, a span, an upper surface, a lower surface, a longitudinal axis, and having:

A. a first spar assembly adjacent the upper surface and including:

1. a low density core member extending in the direction of the span and extending substantially from the root end to the tip end and having a first surface adjacent said longitudinal axis and a second surface nearer said upper surface than said first core surface, and 2. a first spar comprising a plurality of high tensile strength fiber composite members positioned between said core member and said upper airfoil surface and extending substantially from the tip end to the blade root end of the core member and forming a first loop therebeyond with said fiber composite members bonded together and to said second surface of said core member, B. a second spar assembly adjacent the lower surface and including:

1. a low density core member extending in the direction of the span and extending substantially from the root end to the tip end and having a first surface adjacent said longitudinal axis and a second surface nearer said lower surface than said first core surface, and 2. a second spar comprising a plurality of high tensile strength fiber composite members positioned between said core member and said lower airfoil surface and extending substantially from the tip end to the blade root end of the core member and forming a second loop therebeyond with said fiber composite members bonded together and to said second surface of central core member and with said first surfaces of said core members bonded together, C. a tear-shaped plate member extending through said first loop so as to be positioned substantially against the turn of the loop and having said fiber composite members of said first spar bonded to the opposite sides thereof, D. a tear-shaped plate member extending through said second loop so as to be positioned substantially against the turn of the loop and having said fiber composite members of said second spar bonded to the opposite sides thereof, and E. means to connect said first and second plate members to the spar root, thereby providing three load carrying paths between each of said first and second spars and said spar root, namely, the two bonds between said plate member and said fiber composite members in each spar and the load carrying joint formed between said plate member and the turn of each of said loops.

52. A spar according to claim 51 wherein said fiber composite members of said first and second spars are continuous and extend substantially along the blade longitudinal axis and preferably consists of a plurality of layers of broadgoods.

53. A spar according to claim 52 wherein said tear-shaped plate members are made of titanium, and wherein said core member is made of honeycomb construction.

54. A blade according to claim 53 wherein said means connecting said first and second plate members to the spar root is a redundant path, load-carrying structure.

55. The method of fabricating a composite aerodynamic blade having a twin-beam spar construction comprising:
A. fabricating the first half of the blade by:
1. laying-up a series of layers of high strength, low weight fibers along the inner contour of a female mold of selected half-blade shape to the selected blade cover or torque-tube thickness,
2. fabricating a spar or beam including the steps of:
a. laying-up a series of high strength, low weight fiber composites commencing at the blade tip end of the mold and extending to the blade root end of the mold with the fibers extending in substantially the direction of the blade longitudinal axis while allowing about an equal length of each fiber composites to extend beyond the blade root end of the mold,
b. positioning a root end fitting in proper selected position at the blade root end of the mold so that a wedge shaped portion thereof is lying on said fiber composites and with the pointed end of the wedge extending toward the blade tip end of the mold,
c. wrapping the fiber composites around the wedge member and then laying-up the fiber composites against the fiber composites already laid up so as to form a series of fiber composites extending substantially from the blade root end of the mold to the blade tip end of the mold,
3. treating the blade cover portion and the spar portion so layed up to effect bonding thereof,
4. positioning a selectively shaped, low density core member on the fiber composites so bonded so that the core material extends substantially in the direction of the blade longitudinal axis and extends substantially the full distance between the blade root end of the mold and the blade tip end of the mold,
5. finishing the first half of the blade so fabricated to the proper blade chordline,
B. fabricating the second half of the blade following the same procedure,
C. connecting the two blade halves so fabricated together so as to form an aerodynamic blade or spar assembly.

56. The method of fabricating a composite aerodynamic blade having a twin-beam spar construction comprising:
A. fabricating the first half of the blade by:
1. laying-up a series of alternate layers of plastic preimpregnated glass fiber and graphite fiber sheets along the inner contour of a female mold of selected half-blade shape to the selected blade cover to torque-tube thickness,
2. fabricating a spar or beam including the steps of:
a. laying-up a first series of plastic preimpregnated glass fibers commencing at about the blade tip end of the mold and extending to the blade root end of the mold with the fibers extending in substantially the direction of the blade longitudinal axis while allowing about an equal length of each glass fiber to extend beyond the blade root end of the mold,
b. positioning a root end fitting in proper selected position at the blade root end of the mold so that an adhesively surfaced wedge shaped portion thereof is lying on the glass fibers so layed up and with the pointed end of the wedge extending toward the blade tip end of the mold,
c. wrapping the glass fibers around the wedge member and then laying up the glass fibers against the fibers so layed up so as to form a second series of glass fibers extending substantially from the blade root end of the mold to the blade tip end of the mold,
3. curing the blade cover portion and the spar portion so layed up to effect bonding thereof,
4. positioning a selectively shaped, low density core member on the glass fibers so bonded so that the core material extends substantially in the direction of the blade span or longitudinal axis and extends substantially the full distance between the blade root end of the mold and the blade tip end of the mold, and is bonded to glass fibers,
5. machining the first half of the blade so fabricated to the proper blade chordline,
B. fabricating the second half of the blade following the same procedure,
C. bonding the two blade halves so fabricated together so as to form an aerodynamic blade.

57. The method according to claim 56 wherein said glass fiber layers of said spar are caused to terminate at different distances from the blade tip end of the mold so as to effect a thinning or tapering effect of the spar between the blade root end thereof and the blade tip end thereof.

58. The method according to claim 57 wherein the glass fibers which form the blade cover are layed-up so that at least some of the glass fibers are extending in a different direction than other glass fibers.

59. The method according to claim 58 wherein most of the fibers define angles of substantially ± 45° with the blade longitudinal axis and wherein some of the fibers extend in a spanwise direction.

60. The method according to claim 59 and including the additional steps of selectively adding nonstructural counterweights to the inner surface of the blade cover of each blade half before each blade half is machined to the proper blade chordline, and determining the mass distribution of the two blade halves so machined and making any necessary changes to the counterweights as a result of this determination after machining of the two blade halves and before the bonding thereof.

61. The method according to claim 55 wherein the root end fitting is metallic and wherein the method used in connecting the two blade halves is bonding.

62. The method according to claim 61 wherein the two blade halves are bonded by the use of an adhesive layer between the halves.

63. The method according to claim 56 and including the steps of adding additional sheets of plastic impregnated fiber material at the blade cover leading edge and trailing edge so as to provide a greater area for bonding therebetween.

64. The method according to claim 56 and including the additional step of applying an adhesive layer between the root end fitting and the inner surface of the blade cover prior to curing.

65. The method according to claim 56 wherein the curing operation includes applying bleeder cloth and caul plates to the layed-up material in the mold, placing the mold with the layed-up material therein in a vacuum bag, evacuating the bag to compress the layers of layed-up material together, and subjecting the mold and the layed-up material within the vacuum bag so evacuated to selective heat treatment to perform the curing operation.

66. The method of fabricating a composite spar of twin-beam construction for an aerodynamic blade comprising:
A. fabricating the first half of the spar by:
1. laying-up a series of high strength, low weight fiber composites commencing at the spar tip end of a mold and extending to the spar root end of the mold with the fiber composites extending in substantially the direction of the spar span direction or longitudinal axis while allowing about an equal length of each sheet to extend beyond the spar root end of the mold,
2. positioning a root end fitting in proper selected position at the spar root end of the mold so that a wedge shaped portion thereof is lying on said fiber composites and with the pointed end of the wedge extending toward the spar tip end of the mold,
3. wrapping the fiber composites around the wedge member and then laying-up the fiber composites against the fiber composites already layed up so as to form a series of fiber composites extending substantially from the span root end of the mold to about the span tip end of the mold,
4. treating the spar so layed up to effect bonding thereof,
5. positioning a selectively shaped, low density core member on the fiber composites so bonded so that the core material extends substantially in the direction of the core span or longitudinal axis and extends substantially the full distance between the spar root end of the mold and the spar tip end of the mold,
6. finishing the first half of the spar so fabricated to the proper blade chordline,
B. fabricating the second half of the spar following the same procedure,
C. connecting the to spar halves so fabricated together so as to form an aerodynamic blade spar.

67. The method of fabricating a composite torque-tube spar having a twin-beam spar construction comprising:
A. fabricating the first half of the torque-tube by:
1. laying-up a series of layers of high strength composite fibers along the inner contour of a female mold of selected half torque-tube shape to the selected torque-tube thickness,
B. fabricating the first half of the twin-beam spar by:
1. laying-up a series of high strength, low weight composite fibers against the torque-tube fibers commencing at the torque-tube tip end of a mold and extending to the torque-tube root end of the mold with the fiber composites extending in substantially the direction of the torque-tube span direction or longitudinal axis while allowing about an equal length of each sheet to extend beyond the torque-tube root end of the mold,
2. positioning a root end fitting in proper selected position at the torque-tube root end of the mold so that a wedge shaped portion thereof is lying on said fiber composites and with the pointed end of the wedge extending toward the torque-tube tip end of the mold,
3. wrapping the fiber composites around the wedge member and then laying-up the fiber composites against the fiber composites already layed up so as to form a series of fiber composites extending substantially from the torque-tube root end of the mold to about the torque-tube tip end of the mold,
4. treating the half torque-tube so layed up to effect bonding thereof,
5. positioning a selectively shaped, low density core member on the fibers so bonded so that the core material extends substantially in the direction of the torque-tube span or longitudinal axis and extends substantially the full distance between the torque-tube root end of the mold and the torque-tube tip end of the mold,
6. finishing the first half of the torque-tube so fabricated to the proper torque-tube chordline,
C. fabricating the second half of the torque-tube following the same procedure, and
D. connecting the two torque-tube halves so fabricated together so as to form a composite torque-tube.

68. A twin-beam composite spar for an aerodynamic blade adapted to be connected to a hub and having a tip, a root, a chord and a longitudinal axis and including:
A. a first spar assembly including:
1. a first low density central core member extending in the direction of the spar longitudinal axis for a least a portion of the distance between the spar root and the spar tip,
2. a first spar comprising plurality of fiber composite members extending from substantially the spar tip end of the said core member to the spar root end thereof and therebeyond and being folded back upon itself so as to form a loop and then extend from the spar root end of the core member to substantially the spar tip end thereof thereby forming a formation of fiber composite members of substantially U-shape cross section and with said fiber composite members bonded together and to said core member, 3. a first cuff member including:
a. a cuff plate member extending through said loop in said fiber composite members, and to which said fiber composite members are bonded,
b. an attachment means to permit attachment of said first cuff member to the hub, B. a second spar assembly joined to said first spar assembly including:
1. a second low density central core member extending in the direction of the spar longitudinal axis for at least a portion of the distance between the spar root and the spar tip,
2. a second spar comprising plurality of first fiber composite members extending from substantially the spar tip end of said core member to the spar root end thereof and therebeyond and being folded back upon itself so as to form a loop and then extend from the spar root end of the core member to the spar tip end to substantially the spar tip end thereof thereby forming a formation of fiber composite members of substantially U-shape cross section, bonded together and to said core member,
3. a second cuff member including:
a. a cuff plate member extending through said loop in said fiber composite members and to which said fiber composite members are bonded,
b. an attachment means to permit attachment of said second cuff member to the hub, C. filler material cooperating with said first and second spar assemblies so joined to define a spar of selected cross section, and D. a torque-tube enveloping said first and second spar assemblies so joined and said filler material and comprising a plurality of multi-directional layers of fiber composite members so as to carry the torque loads of the spar.

69. A twin-beam composite spar for a helicopter rotor blade and including a root, a tip, a chord, a span, an upper airfoil surface, a longitudinal axis, and having:
A. a first spar assembly adjacent the upper airfoil surface and including:
1. a low density core member extending in the direction of the spar span and extending substantially from the spar root to the spar tip and having a first surface adjacent said blade longitudinal axis and a second surface nearer said upper airfoil surface than said first core surface, and
2. a first spar comprising a plurality of high tensile strength fiber composite members positioned between said core member and said upper airfoil surface and extending substantially from the spar tip end to the spar root end of the core member and therebeyond and turning back upon itself to form a first loop and then extending substantially to said tip end, with said fiber composite members bonded together and to said second surface of said core member, B. a second spar assembly adjacent the lower airfoil surface and including:
1. a low density core member extending in the direction of the spar span and extending substantially from the spar root to the spar tip and having a first surface adjacent said spar longitudinal axis and a second surface nearer said lower airfoil surface than said first core surface, and
2. a second spar comprising a plurality of high tensile strength fiber composite members positioned between said core member and said lower airfoil surface and commencing with a first layer of fibers extending substantially from the spar tip end to the spar root end of the core member and therebeyond and turning back upon itself to form a second loop and then extending substantially to said spar tip, with said fiber composite members bonded together and to said second surface of central core member and with said first surfaces of said core members bonded together, C. a tear-shaped plate member extending through said first loop so as to be positioned substantially against the turn of the loop and with said fiber composite members being bonded to the opposite sides thereof, D. a tear-shaped plate member extending through said second loop so as to be positioned substantially against the turn of the loop and with said fiber composite members being bonded to the opposite sides thereof, E. means to connect said first and second plate members to the blade root, thereby providing three load carrying paths between each of said first and second spars and said blade root, namely, the two bonds between said plate member and said fiber composite members in each spar, and the load carrying joint formed between said plate members and the turn of each of said loops, F. filler material cooperating with said first and second spar assemblies so joined to define a spar of selected cross section, and G. a torque-tube enveloping said first and second spar assemblies so joined and said filler material and comprising a plurality of multidirectional layers of fiber composite members so as to carry the torque loads of the spar.

70. A composite, twin-spar, for a helicopter rotor blade including a root end, a tip end, a span, an upper surface, a lower surface, a longitudinal axis, and having:
A. a first spar assembly adjacent defining the upper surface and including:
1. a low density core member extending in the direction of the span and extending substantially from the root end to the tip end and having a first surface adjacent said longitudinal axis and a second surface nearer said upper surface than said first core surface, and
2. a first spar comprising a plurality of high tensile strength fiber composite members positioned between said core member and said upper airfoil surface and extending substantially from the tip end to the spar root end of the core member and forming a first loop therebeyond with said fiber composite members bonded together and to said second surface of said core member, B. a second spar assembly adjacent defining the lower surface and including:
1. a low density core member extending in the direction of the span and extending substantially from the root end to the tip end and having a first surface adjacent said longitudinal axis and a second surface nearer said lower surface than said first core surface, and 2. a second spar comprising a plurality of high tensile strength fiber composite members positioned between said core member and said lower airfoil surface and extending substantially from the tip end to the spar root end of the core member and forming a second loop therebeyond with said fiber composite members bonded together and to said second surface of central core member and with said first surfaces of said core members bonded together, C. a tear-shaped plate member extending through said first loop so as to be positioned substantially against the turn of the loop and having said fiber composite member of said first spar bonded to the opposite sides thereof, D. a tear-shaped plate member extending through said second loop so as to be positioned substantially against the turn of the loop and having said fiber composite members of said second spar bonded to the opposite sides thereof, E. filler material cooperating with said first and second spar assemblies so joined to define a spar of selected cross section, F. a torque-tube enveloping said first and second spar assemblies so joined and said filler material and comprising a plurality of multidirectional layers of fiber composite members so as to carry the torque loads of the spar, and G. means to connect said first and second plate members to the spar root, thereby providing three load carrying paths between each of said first and second spars and said spar root, namely, the two bonds between said plate member and said fiber composite members in each spar, and the load carrying joint formed between said plate member and the turn of each of said loops.

71. The method of fabricating a composite, twin-beam spar with torque-tube covering for an aerodynamic blade and comprising:

A. fabricating the first half of the spar by:
1. laying-up a series of layers of high strength, low weight fiber composites along the inner contour of a female mold of selected half-blade shape to the selected torque-tube thickness,
2. fabricating a spar or beam including the steps of:
    a. laying-up a series of high strength, low weight fiber composites commencing at the spar tip end of the mold and extending to the spar root end of the mold with the fiber composites extending in substantially the direction of the spar longitudinal axis while allowing about an equal length of each fiber composites to extend beyond the spar root end of the mold,
    b. positioning a root end fitting in proper selected position at the spar root end of the mold so that a wedge shaped portion thereof is lying on said fiber composites and with the pointed end of the wedge extending toward the spar tip end of the mold,
    c. wrapping the fiber composites around the wedge member and then laying-up the fiber composites against the fiber composites already layed-up so as to form a series of fiber composites extending substantially from the spar root end of the mold to the spar tip end of the mold,
3. treating the torque-tube portion and the spar portion so layed-up to effect bonding thereof,
4. positioning a selectively shaped, low density core member on the fiber composites so bonded so that the core material extends substantially in the direction of the spar longitudinal axis and extends substantially the full distance between the spar root end of the mold and the spar tip end of the mold,
5. finishing the first half of the spar so fabricated to the proper spar chordline, B. fabricating the second half of the spar following the same procedure, and C. connecting the two spar halves so fabricated together so as to form a spar assembly.

72. The method of fabricating a composite, twin-beam spar for an aerodynamic blade comprising:

A. fabricating the first half of the spar by:
1. laying-up a series of alternate layers of plastic preimpregnated glass fiber and graphite fiber sheets along the inner contour of a female mold of selected half-spar shape to the selected torque-tube thickness,
2. fabricating a spar or beam including the steps of:
    a. laying-up a first series of plastic preimpregnated glass fibers commencing at about the spar tip end of the mold and extending to the spar root end of the mold with the fibers extending in substantially the direction of the spar longitudinal axis while allowing about an equal length of each glass fiber to extend beyond the spar root end of the mold,
    b. positioning a root end fitting in proper selected position at the spar root end of the mold so that an adhesively surfaced wedge shaped portion thereof is lying on the glass fibers so layed-up and with the pointed end of the wedge extending toward the spar tip end of the mold,
    c. wrapping the glass fibers around the wedge member and then laying-up the glass fibers against the fibers so layed-up so as to form a second series of glass fibers extending substantially from the spar root end of the mold to the spar tip end of the mold,
3. curing the torque-tube and spar portion so layed-up to effect bonding thereof,
4. positioning a selectively shaped, low density core member on the glass so bonded so that the core material extends substantially in the direction of the spar span or longitudinal axis and extends substantially the full distance between the spar root end of the mold and the spar tip end of the mold, and is bonded to glass fibers,
5. machining the first half of the spar so fabricated to the proper spar chordline, B. fabricating the second half of the spar following the same procedure, and C. bonding the two spar halves so fabricated together so as to form a spar assembly.

73. The method of fabricating a composite spar of twin-beam construction for an aerodynamic blade comprising:

A fabricating the first half of the spar by:
1. laying-up a series of high strength, low weight fiber composites commencing at the spar tip end of a mold and extending to the spar root end of the mold with the fiber composites extending in substantially the direction of the spar span direction or longitudinal axis while allowing about an equal length of each sheet to extend beyond the spar root end of the mold, 2. positioning a root end fitting in proper selected position at the spar root end of the mold so that a wedge shaped portion thereof is lying on said fiber composites and with the pointed end of the wedge extending toward the spar tip end of the mold, 3. wrapping the fiber composites around the wedge member and then laying-up the fiber composites against the fiber composites already layed-up so as to form a series of fiber composites extending substantially from the span root end of the mold to about the span tip end of the mold, 4. treating the spar so layed-up to effect bonding thereof, 5. positioning a selectively shaped, low density core member on the fiber composites so bonded so that the core material extends substantially in the direction of the core span or longitudinal axis and extends substantially the full distance between the spar root end of the mold and the spar tip end of the mold, 6. finishing the first half of the spar so fabricated to the proper spar chordline, B. fabricating the second half of the spar following the same procedure, C. connecting the two spar halves so fabricated together so as to form an aerodynamic blade spar, and D. enveloping said blade spar in a torque-tube which comprises a plurality of layers of fiber composites extending in different directions with respect to the spar longitudinal axis.

74. A twin-beam spar, composite aerodynamic blade adapted to be connected to a hub and having a tip, a root, a leading edge, a trailing edge, a chord and a longitudinal axis and including:

A. a first spar assembly including:
 1. a first low density central core member extending in the direction of the spar longitudinal axis for at least a portion of the distance between the spar root and the spar tip,
 2. a first spar comprising a plurality of fiber composite members extending from substantially the spar tip end of said core member to the spar root end thereof and therebeyond and being folded back upon itself so as to form a loop and then extend from the spar root end of the core member to substantially the spar tip end thereof thereby forming a formation of fiber composite members of substantially U-shaped cross section and with said fiber composite members bonded together and to said core member,
 3. a first cuff member including:
  a. a cuff plate member extending through said loop in said fiber composite members, and to which said fiber composite members are bonded,
  b. an attachment means to permit attachment of said first cuff member to the hub,
B. a second assembly joined to said first spar assembly including:

1. a second low density central core member extending in the direction of the spar longitudinal axis for at least a portion of the distance between the spar root and the spar tip,
 2. a second spar comprising a plurality of first fiber composite members extending from substantially the spar tip end of said core member to the spar root end thereof and therebeyond and being folded back upon itself so as to form a loop and then extend from the spar root end of the core member to the spar tip end to substantially the spar tip end thereof thereby forming a formation of fiber composite members of substantially U-shape cross section bonded together and to said core member,
 3. a second cuff member including:
  a. a cuff plate member extending through said loop in said fiber composite members and to which said fiber composite members are bonded,
  b. an attachment means to permit attachment of said second cuff member to the hub,
C. filler material cooperating with said first and second spar assemblies so joined to define a spar of selected cross section,
D. a torque-tube enveloping said first and second spar assemblies so joined and said filler material and comprising a plurality of multi-directional layers of fiber composite members so as to carry the torque loads of the spar, and
E. a blade after portion defining the blade trailing edge and connected to said twin-beam spar and shaped so as to cooperate therewith in defining the blade airfoil cross section.

75. A twin-beam spar, composite helicopter rotor blade and including a root, a tip, a leading edge, a trailing edge, a chord, a span, an upper airfoil surface, a lower airfoil surface, a longitudinal axis, and having:

A. a first spar assembly adjacent the upper airfoil surface and including:
 1. a low density core member extending in the direction of the spar span and extending substantially from the spar root to the spar tip and having a first surface adjacent said blade longitudinal axis and a second surface nearer said upper airfoil surface than said first core surface, and
 2. a first spar comprising a plurality of high tensile strength fiber composite members positioned between said core member and said upper airfoil surface and extending substantially from the spar tip end to the spar root end of the core member and therebeyond and turning back upon itself to form a first loop and then extending substantially to said tip end, with said fiber composite members bonded together and to said second surface of said core member,
B. a second spar assembly adjacent the lower airfoil surface and including:
 1. a low density core member extending in the direction of the spar span and extending substantially from the spar root to the spar tip and having a first surface adjacent said spar longitudinal axis and a second surface nearer said lower airfoil surface than said first core surface, and
 2. a second spar comprising a plurality of high tensile strength fiber composite members positioned between said core member and said lower airfoil surface and commencing with a first layer of fibers extending substantially from the spar tip end to the spar root end of the core member and therebeyond and turning back upon itself to form a second loop and then extending substantially to said spar tip, with said fiber composite members bonded together and to said second surface to central core member and with said first surfaces of said core members bonded together, C. a tear-shaped plate member extending through said first loop so as to be positioned substantially against the turn of the loop and with said fiber composite members being bonded to the opposite sides thereof, D. tear-shaped plate member extending through said second loop so as to be positioned substantially against the turn of the loop and with said fiber composite members being bonded to the opposite sides thereof, E. means to connect said first and second plate members to the blade root, thereby providing three load carrying paths between each of said first and second spars and said blade root, namely, the two bonds between said plate member and said fiber composite members in each spar, and the load carrying joint formed between said plate members and the turn of each of said loops, F. filler material cooperating with said first and second spar assemblies so joined to define a spar of selected cross section, G. a torque-tube enveloping said first and second spar assemblies so joined and said filler material and comprising a plurality of multidirectional layers of fiber composite members so as to carry the torque loads of the spar, and H. a blade after portion defining the blade trailing edge and connected to said twin-beam spar and shaped so as to cooperate therewith in defining the blade airfoil cross section.

76. A composite, twin-spar helicopter rotor blade including a root end, a tip end, a span, an upper surface, a lower surface, a longitudinal axis, and having:

A. a first spar assembly adjacent defining the upper surface and including:
1. a low density core member extending in the direction of the span and extending substantially from the root end to the tip end and having a first surface adjacent said longitudinal axis and a second surface nearer said upper surface than said first core surface, and
2. a first spar comprising a plurality of high tensile strength fiber composite members positioned between said core member and said upper airfoil surface and extending substantially from the tip end to the spar root end of the core member and forming a first loop therebeyond with said fiber composite members bonded together and to said second surface of said core member, B. a second spar assembly adjacent defining the lower surface and including:
1. a low density core member extending in the direction of the span and extending substantially from the root end to the tip end and having a first surface adjacent said longitudinal axis and a second surface nearer said lower surface than said first core surface, and 2. a second spar comprising a plurality of high tensile strength fiber composite members positioned between said core member and said lower airfoil surface and extending substantially from the tip end to the spar root end of the core member and forming a second loop therebeyond with said fiber composite members bonded together and to said second surface of central core member and with said first surfaces of said core members bonded together, C. a tear-shaped plate member extending through said first loop so as to be positioned substantially against the turn of the loop and having said fiber composite members of said first spar bonded to the opposite sides thereof, D. a tear-shaped plate member extending through said second loop so as to be positioned substantially against the turn of the loop and having said fiber composite members of said second spar bonded to the opposite sides thereof, E. filler material cooperating with said first and second spar assemblies so joined to define a spar of selected cross section, F. a torque-tube enveloping said first and second spar assemblies so joined and said filler material and comprising a plurality of multi-directional layers of fiber composite members so as to carry the torque loads of the spar, G. a blade after portion defining the blade trailing edge and connected to said twin-beam spar and shaped so as to cooperate therewith in defining the blade airfoil cross section, and H. means to connect said first and second plate members to the spar root, thereby providing three load carrying paths between each of said first and second spars and said spar root, namely, the two bonds between said plate member and said fiber members in each spar and the load carrying joint formed between said plate member and the turn of each of said loops.

77. The method of fabricating a composite aerodynamic blade having a twin-beam spar with torque-tube covering comprising:

A. fabricating the first half of the spar blade by:
1. laying-up a series of layers of high strength, low weight fiber composites along the inner contour of a female mold of selected half-blade shape to the selected torque-tube thickness,
2. fabricating a spar or beam including the steps of:
   a. laying-up a series of high strength, low weight fiber composites commencing at the spar tip end of the mold and extending to the spar root end of the mold with the fiber composites extending in substantially the direction of the spar longitudinal axis while allowing about an equal length of each fiber composite to extend beyond the spar root end of the mold,
   b. positioning a root end fitting in proper selected position at the spar root end of the mold so that a wedge shaped portion thereof is lying on said fiber composites and with the pointed end of the wedge extending toward the spar tip end of the mold,
   c. wrapping the fiber composites around the wedge member and then laying-up the fibers against the fiber composites already layed up so as to form a series of fiber composites extending substantially from the spar root end of the mold to the spar tip end of the mold,
3. treating the torque-tube portion and the spar portion so layed up to effect bonding thereof,
4. positioning a selectively shaped, low density core member on the fiber composites so bonded so that the core material extends substantially in the direction of the spar longitudinal axis and extends substantially the full distance between the spar root end of the mold and the spar tip end of the mold,
5. finishing the first half of the spar so fabricated to the proper spar chordline,
B. fabricating the second half of the spar following the same procedure,
C. connecting the two spar halves so fabricated together so as to form a spar assembly,
D. enveloping said spar assembly within a plurality of layers of high strength fiber composites, with at least some of the fiber composites of each layer forming different angles with respect to the blade longitudinal axis than the fiber composites of other layers to form a torque-tube enveloping the spar assembly, and
E. attaching blade after portions to the spar assembly with torque-tube of selected shape to cooperate therewith in defining the blade airfoil.

78. The method of fabricating a composite aerodynamic blade having a twin-beam spar comprising:
A. fabricating the first half of the spar by:
1. laying-up a series of alternate layers of plastic preimpregnated glass fiber and graphite fiber sheets along the inner contour of a female mold of selected half spar shape to the selected torque-tube thickness,
2. fabricating a spar of beam including the steps of:
  a. laying-up a first series of plastic preimpregnated glass fiber composites commencing at about the spar tip end of the mold and extending to the spar root end of the mold with the fiber composites extending in substantially the direction of the spar longitudinal axis while allowing about an equal length of each glass fiber composites to extend beyond the spar root end of the mold,
  b. positioning a root end fitting in proper selected position at the spar root end of the mold so that an adhesively surfaced wedge shaped portion thereof is lying on the glass fiber composites so layed-up and with the pointed end of the wedge extending toward the spar tip end of the mold,
  c. wrapping the glass fiber composites around the wedge member and then laying up the glass fiber composites against the fiber composites so layed-up so as to form a second series of glass fiber composites extending substantially from the spar root end of the mold to the spar tip end of the mold,
3. curing the torque-tube and spar portion so layed up to effect bonding thereof,
4. positioning a selectively shaped, low density core member on the glass fiber composites so bonded so that the core material extends substantially in the direction of the spar span or longitudinal axis and extends substantially the full distance between the spar root end of the mold and the spar tip end of the mold, and is bonded to glass fibers,
5. machining the first half of the spar so fabricated to the proper spar chordline,
B. fabricating the second half of the spar following the same procedure,
C. bonding the two spar halves so fabricated together so as to form a spar assembly,
D. enveloping said spar assembly within a plurality of layers of high strength fiber composites, with at least some of the fiber composites of each layer forming different angles with respect to the blade longitudinal axis than the fiber composites of the layers to form a torque-tube enveloping the spar assembly, and
E. attaching blade after portions to the spar assembly with torque-tube of selected shape to cooperate therewith in defining the blade airfoil.

79. The method of fabricating an aerodynamic blade with a composite spar of twin-beam construction comprising:
A. fabricating the first half of the spar by:
1. laying-up a series of high strength, low weight fiber composites commencing at the spar tip end of a mold and extending to the spar root end of the mold with the fibers extending in substantially the direction of the spar span direction or longitudinal axis while allowing about an equal length of each sheet to extend beyond the spar root end of the mold,
2. positioning a root end fitting in proper selected position at the spar root end of the mold so that a wedge shaped portion thereof is lying on said fiber composites and with the pointed end of the wedge extending toward the spar tip end of the mold,
3. wrapping the fiber composites around the wedge member and then laying-up the fiber composites against the fiber composites already layed-up so as to form a series of fiber composites extending substantially from the span root end of the mold to about the span tip end of the mold,
4. treating the spar so layed-up to effect bonding thereof,
5. positioning a selectively shaped, low density core member on the fiber composites so bonded so that the core material extends substantially in the direction of the core span or longitudinal axis and extends substantially the full distance between the spar root end of the mold and the spar tip end of the mold,
6. finishing the first half of the spar so fabricated to the proper spar chordline,
B. fabricating the second half of the spar following the same procedure,
C. connecting the two spar halves so fabricated together so as to form an aerodynamic blade spar,
D. enveloping said blade spar in a torque-tube which comprises a plurality of layers of fiber composites extending in different directions with respect to the longitudinal axis, and
E. attaching blade after portions to the spar assembly with torque-tube of selected shape to cooperate therewith in defining the blade airfoil.

80. A twin-beam spar, composite aerodynamic blade adapted to be connected to a hub and rotate with other blades to generate power and having a tip, a root, a leading edge, a trailing edge, a chord and a longitudinal axis and including:

A. a first spar member including:
1. a plurality of first fiber composite members extending from substantially the blade tip to substantially the blade root and being folded back upon itself so as to form a loop and then extending from substantially the blade root to substantially the blade tip thereby forming a plurality of second fiber composite members abutting said plurality of first fiber composite members and cooperating therewith in forming a formation of fiber composite members of substantially U-shape cross section and with said first and second fiber composite members bonded together,
2. a first cuff member including:
   a. a cuff plate member extending through said loop in said fiber composite members, and to which said fiber composite members are bonded,
   b. an attachment means to permit attachment of said first cuff member to the hub,
B. a second spar member including:
1. a plurality of second fiber composite members extending from substantially the blade tip to substantially the blade root and being folded back upon itself so as to form a loop and then extending from substantially the blade root to substantially the blade tip thereby forming a plurality of second fiber composite members abutting said plurality of first fiber composite members and cooperating therewith in forming a formation of fiber composite members of substantially U-shape cross section bonded together,
2. a second cuff member including:
   a. a cuff plate member extending through said loop in said fiber composite members and to which said fiber composite members are bonded,
   b. an attachment means to permit attachment of said second cuff member to the hub,
C. filler material cooperating with said first and second spar members to define a blade of airfoil shape cross section, and
D. a blade cover enveloping said first and second spar members and said filler material and bonded thereto and comprising a plurality of multidirectional layers of fiber members so as to carry the torque loads of the blade.

81. A blade according to claim 80 wherein said fiber composite members of said first and second spar members and said blade cover are each formed in layers, and wherein the layers of the cover are interleaved with the layers of the fiber composite members.

82. A twin-beam spar, composite aerodynamic blade adapted to be connected to a hub and rotate with other blades to generate power and having a tip, a root, a leading edge, a trailing edge, a chord and a longitudinal axis and including:
A. a first spar assembly including:
1. a first spar comprising a plurality of fiber composite members extending from substantially the blade tip to substantially the blade root and being folded back upon itself so as to form a loop and then extending from substantially the blade root to substantially the blade tip thereby forming a formation of fiber composite members of substantially U-shape cross section and with said fiber composite members bonded together,
2. a first cuff member including:
   a. a cuff plate member extending through said loop in said fiber composite members, and to which said fiber composite members are bonded,
   b. an attachment means to permit attachment of said first cuff member to the hub,
B. a second spar assembly including:
1. a second spar comprising a plurality of fiber composite members extending from substantially the blade tip to substantially the blade root and being folded back upon itself so as to form a loop and then extending from substantially the blade root to substantially the blade tip thereby forming a formation of fiber compositie members of substantially U-shape cross section bonded together,
2. a second cuff member including:
   a. a cuff plate member extending through said loop in said fiber composite members and to which said fiber composite members are bonded,
   b. an attachment means to permit attachment of said second cuff member to the hub,
C. filler material cooperating with said first and second spar assemblies to define a blade of airfoil shape cross section, and
D. a blade cover enveloping said first and second spar assemblies and said filler material and bonded thereto and comprising a plurality of fiber composite members so as to carry the torque loads of the blade.

83. A blade according to claim 82 wherein said fiber composite members of said first and second spar assemblies and siad blade cover are each formed in layers, and wherein the layers of the cover are interleaved with the layers of the fiber composite members.

84. A twin-beam composite spar for an aerodynamic blade adapted to be connected to a hub and having a tip, a root, a chord and a longitudinal axis and including:
A. a first spar assembly including:
1. a first spar comprising a plurality of fiber composite members extending from substantially the spar tip to substantially the spar root and being folded back upon itself so as to form a loop and then extending from substantially the spar root end to substantially the spar tip thereby forming a formation of fiber composite members of substantially U-shape cross section and with said fiber composite members bonded together,
2. a first cuff member including:
   a. a cuff plate member extending through said loop in said fiber composite members, and to which said fiber composite members are bonded,
   b. an attachment means to permit attachment of said first cuff member to the hub, B. a second spar assembly including:
1. a second spar comprising a plurality of first fiber composite members extending from substantially the spar tip to substantially the spar root and being folded back upon itself so as to form a loop and then extending from substantially the spar root to substantially the spar tip thereby forming a formation of fiber composite members of substantially U-shape cross section and bonded together, 2. a second cuff member including:
   a. a cuff plate member extending through said loop in said fiber composite members and to which said fiber composite members are bonded,
   b. an attachment means to permit attachment of said second cuff member to the hub, C. filler material cooperating with said first and second spar assemblies so joined to define a spar of selected cross section, and D. a torque-tube enveloping said first and second spar assemblies and said filler material and bonded thereto and comprising a plurality of multidirectional layers of fiber composite members so as to carry the torque loads of the spar.

85. A blade according to claim 84 wherein said fiber composite members of said first and second spar assemblies and said torque tube are each formed in layers, and wherein the layers of the torque tube are interleaved with the layers of the fiber composite members.

86. A twin-beam spar, composite aerodynamic blade adapted to be connected to a hub and having a tip, a root, a leading edge, a trailing edge, a chord and a longitudinal axis and including:

A. a first spar assembly including:
   1. a first spar comprising a plurality of fiber members extending from substantially the spar tip to substantially the spar root and being folded back upon itself so as to form a loop and then extending from substantially the spar root to substantially the spar tip thereby forming a formation of fiber composite members of substantially U-shape cross section and with said fiber composite members bonded together,
   2. a first cuff member including:
      a. a cuff plate member extending through said loop in said fiber composite members, and to which said fiber composite members are bonded,
      b. an attachment means to permit attachment of said first cuff member to the hub, B. a second assembly joined to said first spar assembly including:
   1. a second spar comprising a plurality of first fiber composite members extending from substantially the spar tip to substantially the spar root and being folded back upon itself so as to form a loop and then extending from substantially the spar root to substantially the spar tip thereby forming a formation of fiber composite members of substantially U-shape cross section bonded together,
   2. a second cuff member including:
      a. a cuff plate member extending through said loop in said fiber composite members and to which said fiber composite members are bonded,
      b. an attachment means to permit attachment of said second cuff member to the hub, C. filler material cooperating with said first and second spar assemblies to define a spar of selected cross section, D. a torque-tube enveloping said first and second spar assemblies and said filler material and bonded thereto and comprising a plurality of multidirectional layers of fiber composite members so as to carry the torque loads of the spar, and E. a blade after portion defining the blade trailing edge and connected to said twin-beam sapr and shaped so as to cooperate therewith in defining the blade airfoil cross section.

87. A blade according to claim 86 wherein said fiber composite members of said first and second spar assemblies and said torque-tube are each formed in layers, and wherein the layers of the torque-tube are interleaved with the layers of the fiber composite members.

88. The method of producing an aerodynamic blade comprising the steps of:

A. fabricating a first half-blade extending in the span direction and shaped to define substantially a half-blade, B. fabricating a second half-blade extending in the span direction and shaped to cooperate with the first half-blade to form a full blade when joined thereto, C. reshaping the first and second half-blades so that when joined they will form a full blade of the desired shape, D. determining the mass distribution of the first and second half-blades, E. modifying the mass distribution of the first and second half-blades so as to produce a full blade of desired mass distribution when the first and second half-blades are joined, and F. joining the first and second half-blades so reshaped and so mass distribution modified to form a full blade of desired shape.

89. A twin-beam spar, composite aerodynamic blade adapted to be connected to a hub and rotate with other blades to generate power and having a tip, a root, a leading edge, a trailing edge, a chord and a longitudinal axis and including:

A. a first spar member including:
   1. a plurality of first fiber composite members extending from substantially the blade tip to substantially the blade root and being folded back upon itself so as to form a loop and then extending from substantially the blade root to substantially the blade tip thereby forming a plurality of second fiber composite members abutting said plurality of first fiber composite members and cooperating therewith in forming a formation of fiber composite members of substantially U-shape cross section and with said first and second fiber composite members bonded together,
   2. a first cuff member including:
   a. a cuff plate member extending through said loop in said fiber composite members, and to which said fiber composite members are bonded,
   b. an attachment means to permit attachment of said first cuff member to the hub, B. a second spar member including:
   1. a plurality of second fiber composite members extending from substantially the blade tip to substantially the blade root and being folded back upon itself so as to form a loop and then extending from substantially the blade root to substantially the blade tip thereby forming a plurality of second fiber composite members abutting said plurality of first fiber composite members and cooperating therewith in forming a formation of fiber members of substantially U-shape cross section bonded together, 2. a second cuff member including:
   a. a cuff plate member extending through said loop in said fiber composite members and to which said fiber composite members are bonded,
   b. an attachment means to permit attachment of said second cuff member to the hub, C. a blade cover enveloping said first and second spar members comprising a plurality of multidirectional layers of fiber composite members so as to carry the torque loads of the blade.

90. A blade according to claim 89 wherein said fiber composite members of said first and second spar members and said blade cover are each formed in layers, and wherein the layers of the cover are interleaved with the layers of the fiber composite members.

91. A twin-beam spar, composite aerodynamic blade adapted to be connected to a hub and rotate with other blades to generate power and having a tip, a root, a leading edge, a trailing edge, a chord and a longitudinal axis and including:

A. a first spar assembly including:
   1. a first spar comprising a plurality of fiber composite members extending from substantially the blade tip to substantially the blade root and being folded back upon itself so as to form a loop and then extending from substantially the blade root to substantially the blade tip thereby forming a formation of fiber composite members of substantially U-shape cross section and with said fiber composite members bonded together,
   2. a first cuff member including:
      a. a cuff plate member extending through said loop in said fiber composite members, and to which said fiber composite members are bonded,
      b. an attachment means to permit attachment of said first cuff member to the hub, B. a second spar assembly including:
   1. a second spar comprising a plurality of fiber composite members extending from substantially the blade tip to substantially the blade root and being folded back upon itself so as to form a loop and then extending from substantially the blade root to substantially the blade tip thereby forming a formation of fiber composite members of substantially U-shape cross section bonded together,
   2. a second cuff member including:
      a. a cuff plate member extending through said loop in said fiber composite members and to which said fiber composite members are bonded,
      b. an attachment means to permit attachment of said second cuff member to the hub, C. a blade cover enveloping said first and second spar assemblies and bonded thereto and comprising a plurality of multidirectional layers of fiber composite members so as to carry the torque loads of the blade.

92. A blade according to claim 91 wherein said fiber composite members of said first and second spar assemblies and said blade cover are each formed in layers, and wherein the layers of the cover are interleaved with the layers of the fiber composite members.

93. A twin-beam composite spar for an aerodynamic blade adapted to be connected to a hub and having a tip, a root, a chord and a longitudinal axis and including:

A. a first spar assembly including:
   1. a first spar comprising a plurality of fiber composite members extending from substantially the spar tip to substantially the spar root and being folded back upon itself so as to form a loop and then extending from substantially the spar root end to substantially the spar tip thereby forming a formation of fiber composite members of substantially U-shape cross section and with said fiber composite members bonded together,
   2. a first cuff member including:
      a. a cuff plate member extending through said loop in said fiber composite members, and to which said fiber composite members are bonded,
      b. an attachment means to permit attachment of said first cuff member to the hub, B. a second spar assembly including:
   1. a second spar comprising a plurality of first fiber composite members extending from substantially the spar tip to substantially the spar root and being folded back upon itself so as to form a loop and then extending from substantially the spar root to substantially the spar tip thereby forming a formation of fiber composite members of substantially U-shape cross section and bonded together,
   2. a second cuff member including:
      a. a cuff plate member extending through said loop in said fiber composite members and to which said fiber composite members are bonded,
      b. an attachment means to permit attachment of said second cuff member to the hub, C. a torque-tube enveloping said first and second spar assemblies and bonded thereto and comprising a plurality of multidirectional layers of fiber composite members so as to carry the torque loads of the spar.

94. A spar according to claim 93 wherein said fiber composite members of said first and second spar assemblies and said torque-tube are each formed in layers, and wherein the layers of the torque-tube are interleaved with the layers of the fiber composite members.

95. A twin-beam spar, composite aerodynamic blade adapted to be connected to a hub and having a tip, a root, a leading edge, a trailing edge, a chord and a longitudinal axis and including:

A. a first spar assembly including:
   1. a first spar comprising a plurality of fiber members extending from substantially the spar tip to substantially the spar root and being folded back upon itself so as to form a loop and then extending from substantially the spar root to substantially the spar tip thereby forming a formation of fiber composite members of substantially U-shape cross section and with said fiber composite members bonded together,
   2. a first cuff member including:
      a. a cuff plate member extending through said loop in said fiber composite members, and to which said fiber composite members are bonded, b. an attachment means to permit attachment of said first cuff member to the hub, B. a second assembly joined to said first spar assembly including:
1. a second spar comprising a plurality of first fiber composite members extending from substantially the spar tip to substantially the spar root and being folded back upon itself so as to form a loop and then extending from substantially the spar root to substantially the spar tip thereby forming a formation of fiber composite members of substantially U-shape cross section bonded together,
2. a second cuff member including:
   a. a cuff plate member extending through said loop in said fiber composite members and to which said fiber composite members are bonded,
   b. an attachment means to permit attachment of said second cuff member to the hub,
C. a torque-tube enveloping said first and second spar assemblies and bonded thereto and comprising a plurality of multidirectional layers of fiber composite members so as to carry the torque loads of the spar, and
D. a blade after portion defining the blade trailing edge and connected to said twin-beam spar and shaped so as to cooperate therewith in defining the blade airfoil cross section.

96. A blade according to claim 95 wherein said fiber composite members of said first and second spar assemblies and said torque-tube are each formed in layers, and wherein the layers of the torque-tube are interleaved with the layers of the fiber composite members.

97. A twin-beam spar, aerodynamic blade adapted to be connected to a hub and rotate with other blades to generate power and having a tip, a root, a leading edge, a trailing edge, a chord and a longitudinal axis and including:
A. a first spar member including:
1. a plurality of first members extending from substantially the blade tip to substantially the blade root and being folded back upon itself so as to form a loop and then extending from substantially the blade root to substantially the blade tip thereby forming a plurality of second fiber composite members abutting said plurality of first members and cooperating therewith in forming a formation of members of substantially U-shape cross section and with said first and second members bonded together,
2. a first cuff member including:
   a. a cuff plate member extending through said loop in said members, and to which said members are bonded,
   b. an attachment means to permit attachment of said first cuff member to the hub,
B. a second spar member including:
1. a plurality of second members extending from substantially the blade tip to substantially the blade root and being folded back upon itself so as to form a loop and then extending from substantially the blade root to substantially the blade tip thereby forming a plurality of second members abutting said plurality of first members and cooperating therewith in forming a formation of members of substantially U-shape cross section bonded together,
2. a second cuff member including:
   a. a cuff plate member extending through said loop in said members and to which said members are bonded,
   b. an attachment means to permit attachment of said second cuff member to the hub,
C. a blade cover enveloping said first and second spar members and bonded thereto and comprising a plurality of multidirectional layers of members so as to carry the torque loads of the blade.

98. A blade according to claim 97 wherein said members of said first and second members and said blade cover members are composite fibers, wire or sheet material.

99. A blade according to claim 98 wherein said members of said first and second spar members and said blade cover are each formed in layers, and wherein the layers of the cover are interleaved with the layers of the members.

100. A twin-beam spar, aerodynamic blade adapted to be connected to a hub and rotate with other blades to generate power and having a tip, a root, a leading edge, a trailing edge, a chord and a longitudinal axis and including:
A. a first spar assembly including:
1. a first spar comprising a pluraltiy of members extending from substantially the blade tip to substantially the blade root and being folded back upon itself so as to form a loop and then extending from substantially the blade root to substantially the blade tip thereby forming a formation of members of substantially U-shape cross section and with said members bonded together,
2. a first cuff member including:
   a. a cuff plate member extending through said loop in said members, and to which said members are bonded,
   b. an attachment means to permit attachment of said first cuff member to the hub,
B. a second spar assembly including:
1. a second spar comprising a plurality of members extending from substantially the blade tip to substantially the blade root and being folded back upon itself so as to form a loop and then extend from substantially the blade root to substantially the blade tip thereby forming a formation of members of substantially U-shape cross section bonded together,
2. a second cuff member including:
   a. a cuff plate member extending through said loop in said members and to which said members are bonded,
   b. an attachment means to permit attachment of said second cuff member to the hub,
C. a blade cover enveloping said first and second spar assemblies and bonded thereto and comprising a plurality of multidirectional layers of members so as to carry the torque loads of the blade.

101. A blade according to claim 100 wherein said members of said first and second spar assemblies and said blade cover members are composite fibers, wire or sheet material.

102. A blade according to claim 100 wherein said members of said first and second spar assemblies and said blade cover are each formed in layers, and wherein the layers of the cover are interleaved with the layers of the members.

103. A twin-beam spar for an aerodynamic blade adapted to be connected to a hub and having a tip, a root, a chord and a longitudinal axis and including:
A. a first spar assembly including:
1. a first spar comprising a plurality of members extending from substantially the spar tip to substantially the spar root and being folded back upon itself so as to form a loop and then extending from substantially the spar root end to substantially the spar tip thereby forming a formation of members of substantially U-shape cross section and with said members bonded together,
2. a first cuff member including:
a. a cuff plate member extending through said loop in said members, and to which said members are bonded,
b. an attachment means to permit attachment of said first cuff member to the hub,
B. a second spar assembly including:
1. a second spar comprising a plurality of first members extending from substantially the spar tip to substantially the spar root and being folded back upon itself so as to form a loop and then extending from substantially the spar root to substantially the spar tip thereby forming a formation of members of substantially U-shape cross section and bonded together,
2. a second cuff member including:
a. a cuff plate member extending through said loop in said members and to which said members are bonded,
b. an attachment means to permit attachment of said second cuff member to the hub,
C. a torque-tube enveloping said first and second spar assemblies and bonded thereto and comprising a plurality of multidirectional layers of members so as to carry the torque loads of the spar.

104. A spar according to claim 103 wherein said members of said first and second spar assemblies and said torque-tube members are composite fibers, wire or sheet material.

105. A spar according to claim 103 wherein said members of said first and second spar assemblies and said torque-tube are each formed in layers, and wherein the layers of the torque-tube are interleaved with the layers of the members.

106. A twin-beam spar, aerodynamic blade adapted to be connected to a hub and having a tip, a root, a leading edge, a trailing edge, a chord and a longitudinal axis and including:
A. a first spar asembly including:
1. a first spar comprising a plurality of members extending from substantially the spar tip to substantially the spar root and being folded back upon itself so as to form a loop and then extending from substantially the spar root to substantially the spar tip thereby forming a formation of members of substantially U-shape cross section and with said members bonded together,
2. a first cuff member including:
a. a cuff plate member extending through said loop in said members, and to which said members are bonded,
b. an attachment means to permit attachment of said first cuff member to the hub,
B. a second assembly joined to said first spar assembly including:
1. a second spar comprising a plurality of first members extending from substantially the spar tip to substantially the spar root and being folded back upon itself so as to form a loop and then extending from substantially the spar root to substantially the spar tip thereby forming a formation of members of substantially U-shap cross section bonded together,
2. a second cuff member including:
a. a cuff plate member extending through said loop in said members and to which said members are bonded,
b. an attachment means to permit attachment of said second cuff member to the hub,
C. a torque-tube enveloping said first and second spar assemblies and bonded thereto and comprising a plurality of multidirectional layers of members so as to carry the torque loads of the spar, and
D. a blade after portion defining the blade trailing edge and connected to said twin-beam spar and shaped so as to cooperate therewith in defining the blade airfoil cross section.

107. A blade according to claim 106 wherein said members of said first and second members and said torque-tube members are composite fibers, wire or sheet material.

108. A blade according to claim 106 wherein said members of said first and second spar assembies and said torque-tube are each formed in layers, and wherein the layers of the torque-tube are interleaved with the layers of the members.

* * * * *